United States Patent
Kouno

(10) Patent No.: US 7,916,618 B2
(45) Date of Patent: Mar. 29, 2011

(54) OPTICAL PICKUP AND INFORMATION DEVICE

(75) Inventor: Akira Kouno, Saitama (JP)

(73) Assignee: Pioneer Corporation, Tokyo (JP)

( * ) Notice: Subject to any disclaimer, the term of this patent is extended or adjusted under 35 U.S.C. 154(b) by 330 days.

(21) Appl. No.: 12/295,046

(22) PCT Filed: Mar. 29, 2007

(86) PCT No.: PCT/JP2007/056928
§ 371 (c)(1),
(2), (4) Date: Dec. 29, 2008

(87) PCT Pub. No.: WO2007/114281
PCT Pub. Date: Oct. 11, 2007

(65) Prior Publication Data
US 2009/0129254 A1    May 21, 2009

(30) Foreign Application Priority Data
Mar. 30, 2006    (JP) .................................. 2006-095908

(51) Int. Cl.
*G11B 7/24* (2006.01)
*G11B 7/00* (2006.01)
(52) U.S. Cl. .................. 369/275.4; 369/112.03; 369/94
(58) Field of Classification Search ............... 369/275.4, 369/112.01, 112.03, 112.04, 112.05, 112.07, 369/44.41, 44.26, 116, 94, 44.27, 44.37, 53.37
See application file for complete search history.

(56) References Cited

U.S. PATENT DOCUMENTS

| | | | |
|---|---|---|---|
| 6,314,071 B1* | 11/2001 | Alon et al. ................ | 369/53.37 |
| 2009/0274029 A1* | 11/2009 | Izawa et al. .................... | 369/94 |
| 2009/0274031 A1* | 11/2009 | Kouno ..................... | 369/112.03 |
| 2009/0323501 A1* | 12/2009 | Yanagawa et al. ....... | 369/112.03 |

FOREIGN PATENT DOCUMENTS

| | | |
|---|---|---|
| JP | 10-124906 | 5/1998 |
| JP | 2001-216662 | 8/2001 |
| JP | 2005-044513 | 2/2005 |
| JP | 2005-063595 | 3/2005 |
| JP | 2005-203090 | 7/2005 |
| JP | 2005-216430 | 8/2005 |
| JP | 2005-228436 | 8/2005 |
| JP | 2005-339766 | 12/2005 |
| JP | 2005-346882 | 12/2005 |
| JP | 2006-344344 | 12/2006 |

OTHER PUBLICATIONS

International Search Report for PCT/JP2007/056928 mailed May 15, 2007.

* cited by examiner

*Primary Examiner* — Ali Neyzari
(74) *Attorney, Agent, or Firm* — Nixon & Vanderhye P.C.

(57) ABSTRACT

An optical pickup for irradiating an information recording medium, such as a DVD, with a laser beam when an information signal is recorded or reproduced, and information equipment provided with the optical pickup.

22 Claims, 16 Drawing Sheets

[FIG. 1]
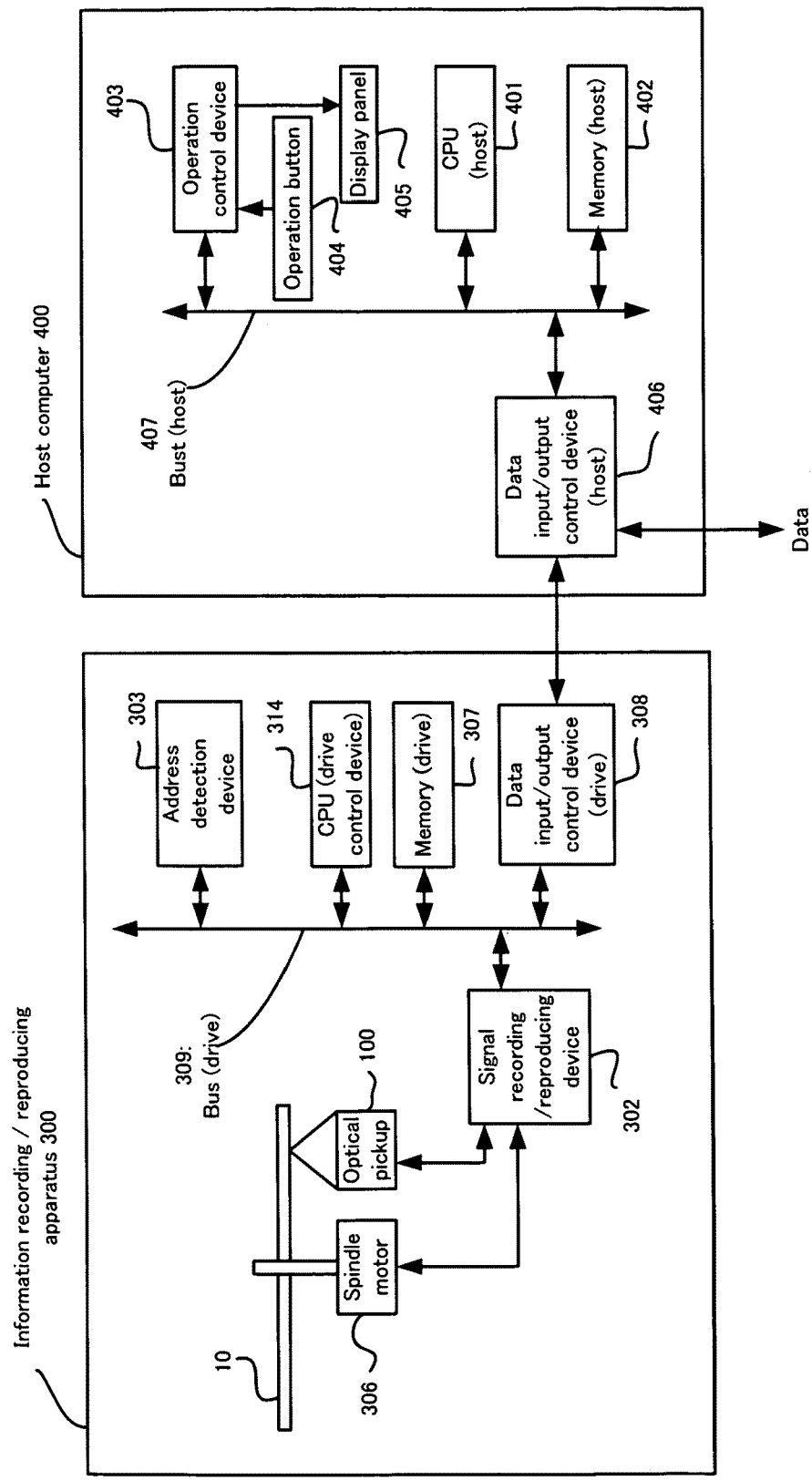

[FIG. 2]
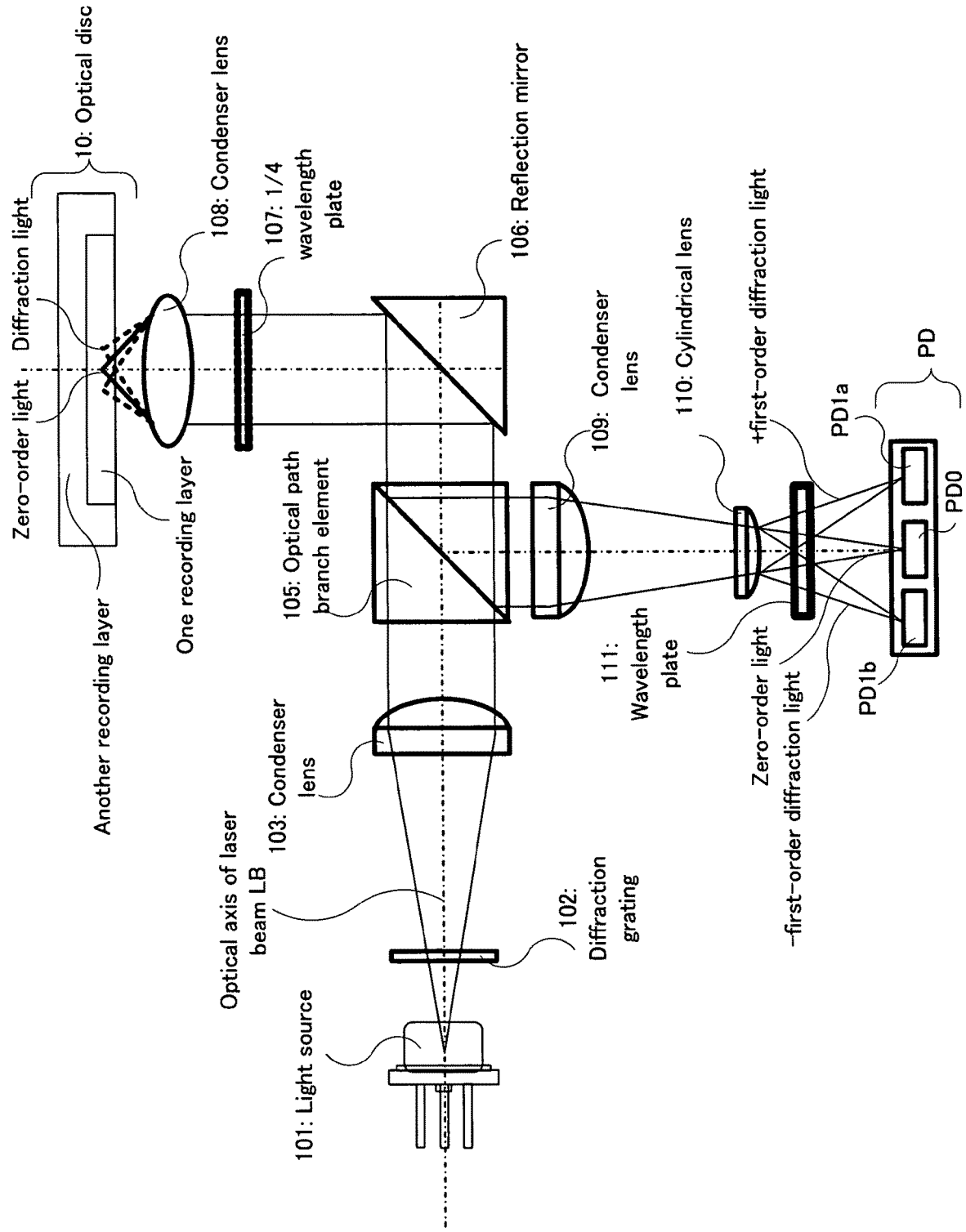

[FIG. 3]
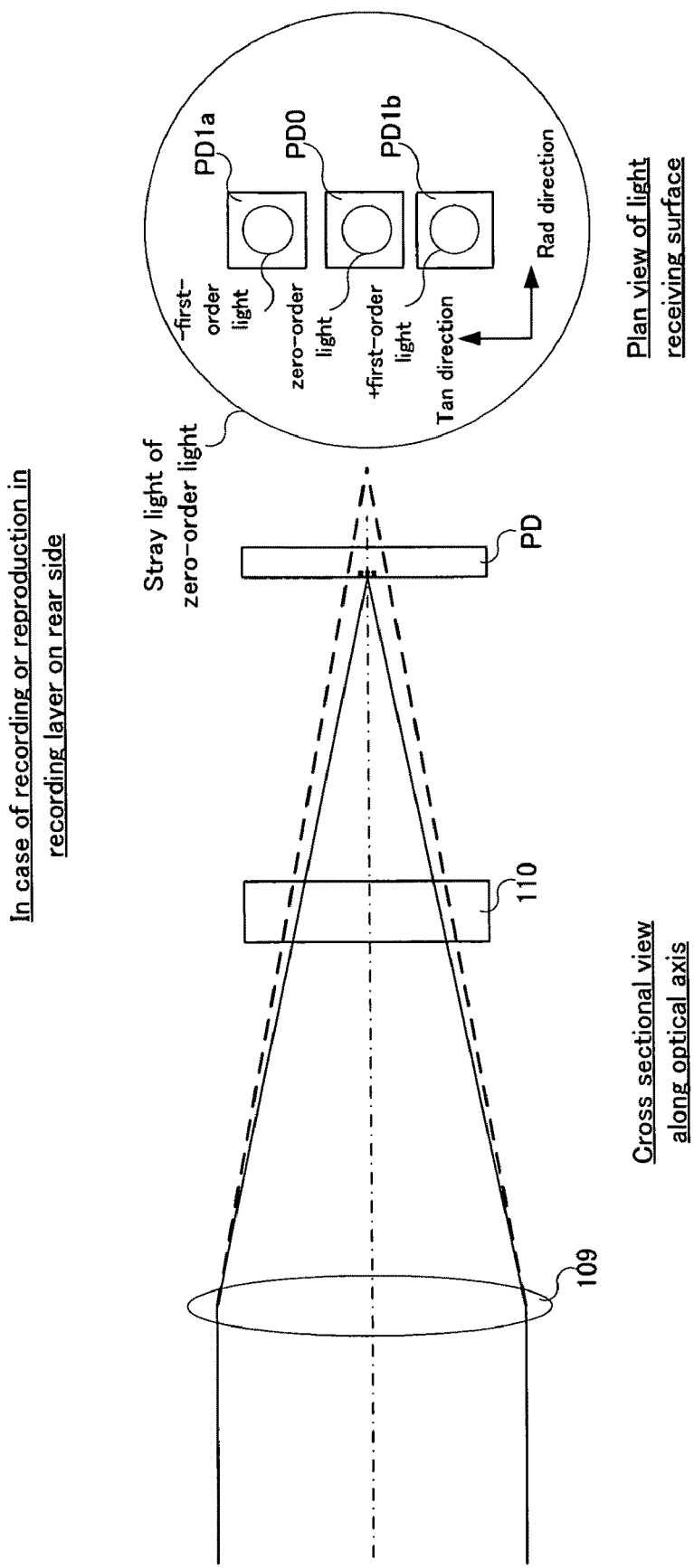

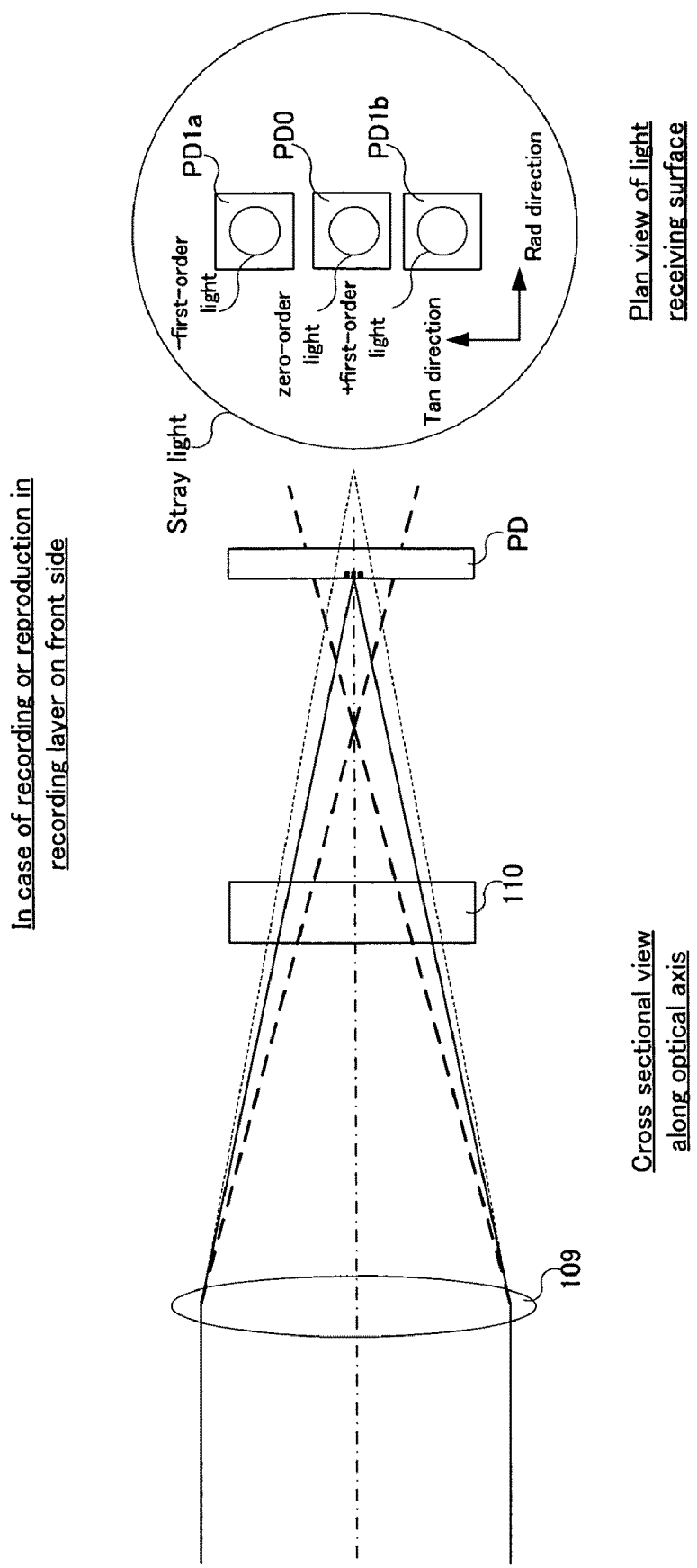
[FIG. 4]

[FIG. 5]
(a)
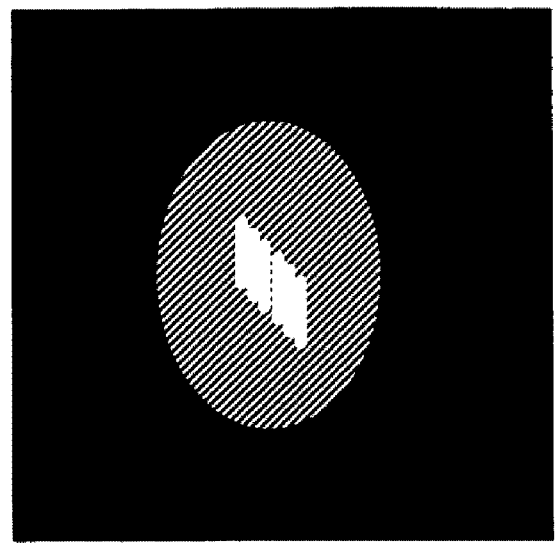
(b)
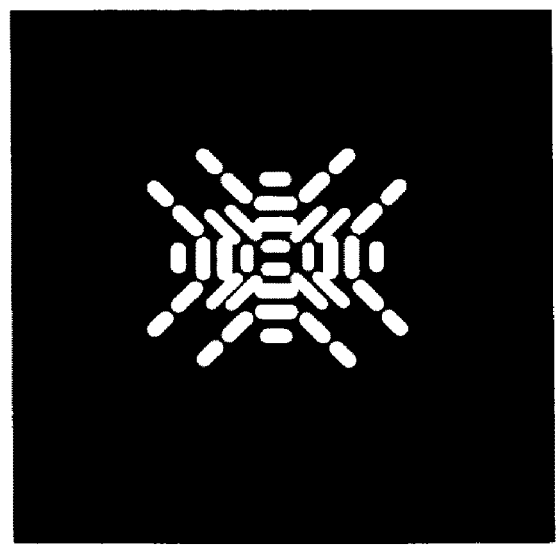

[FIG. 6]
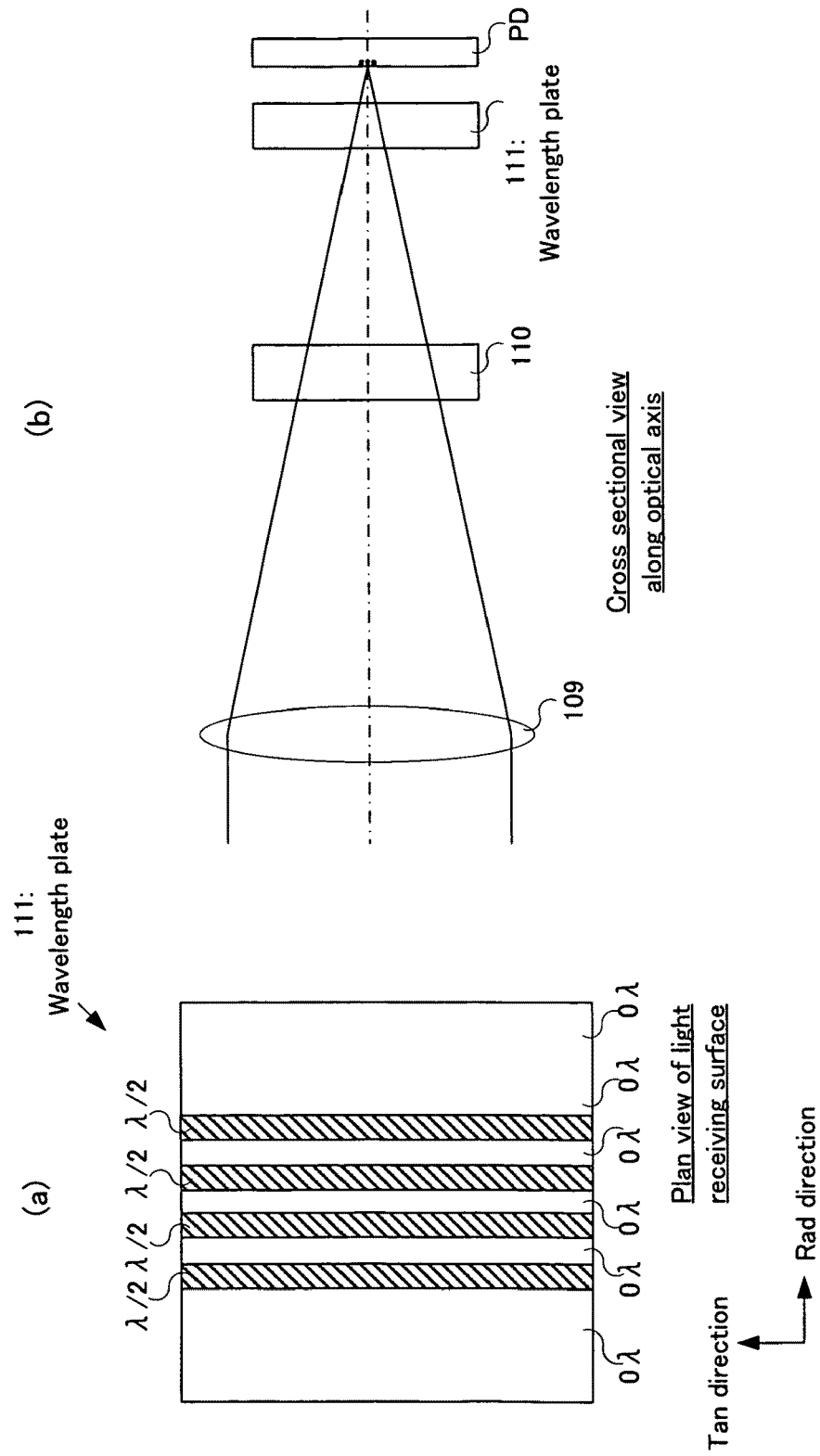

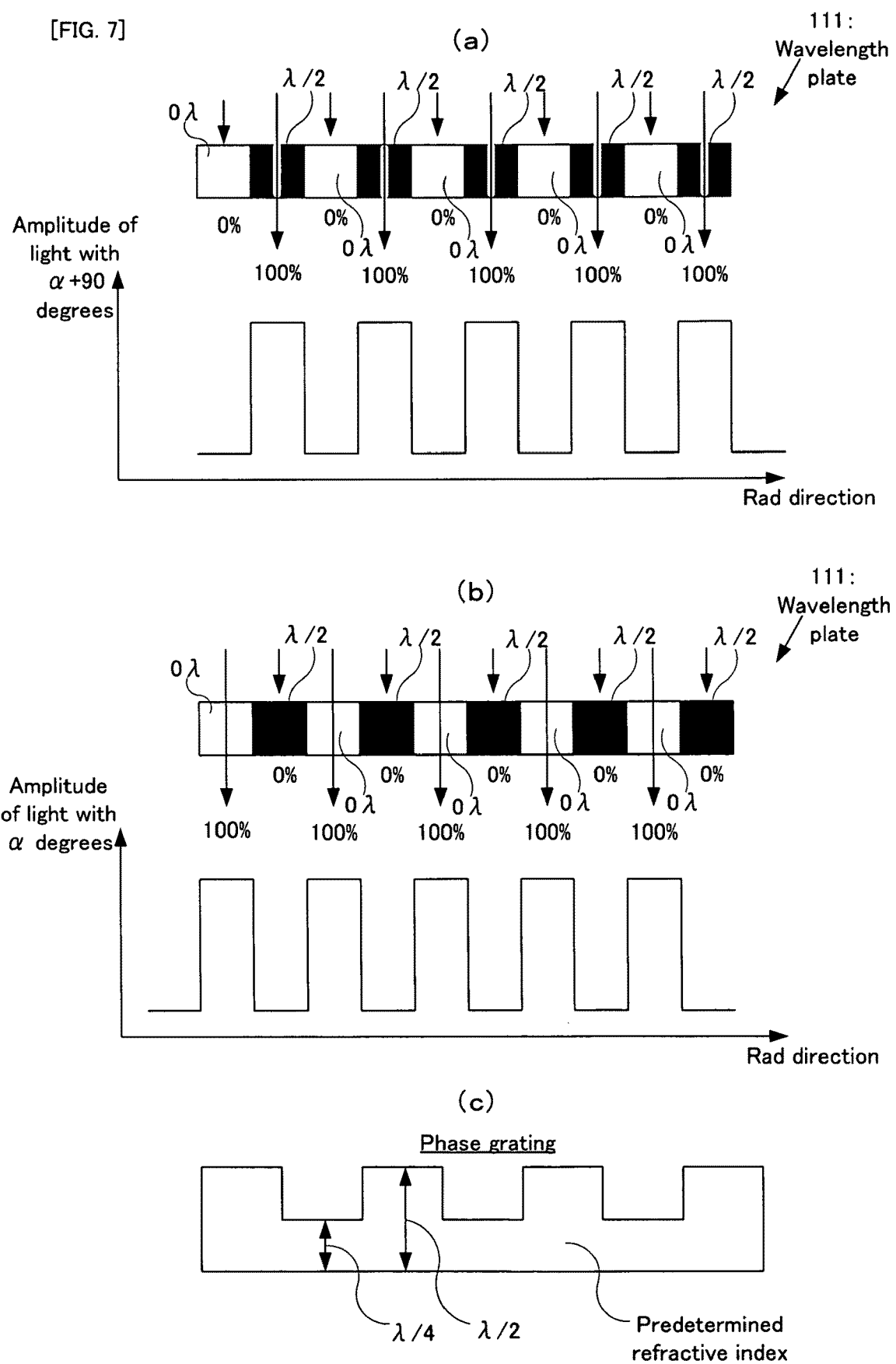

[FIG. 8]
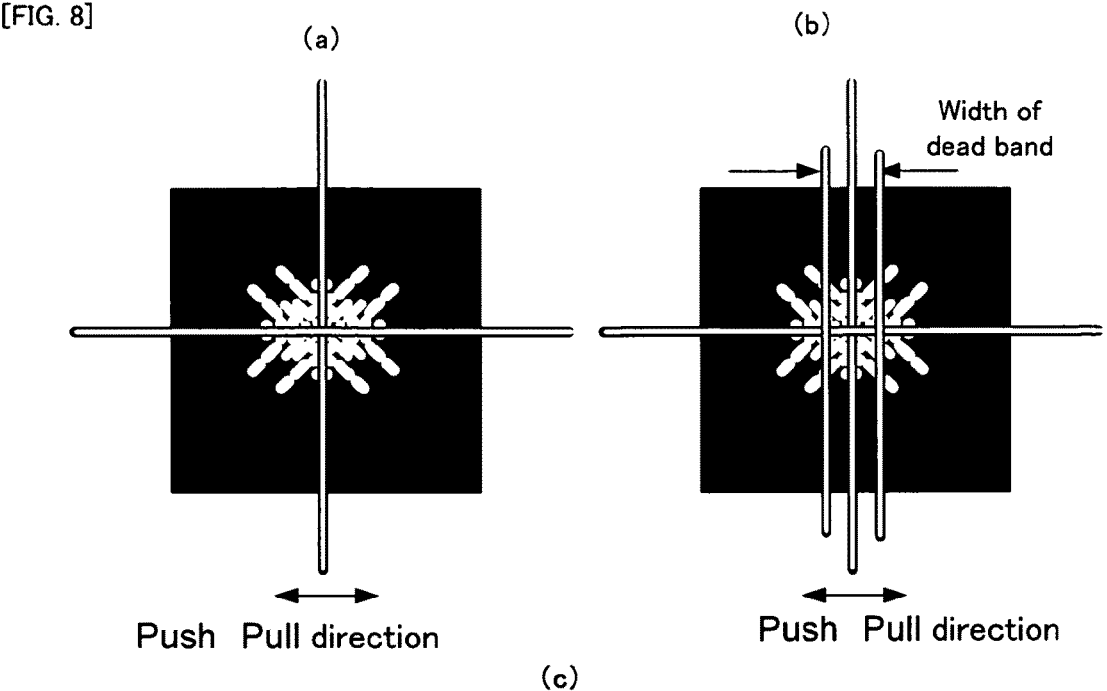
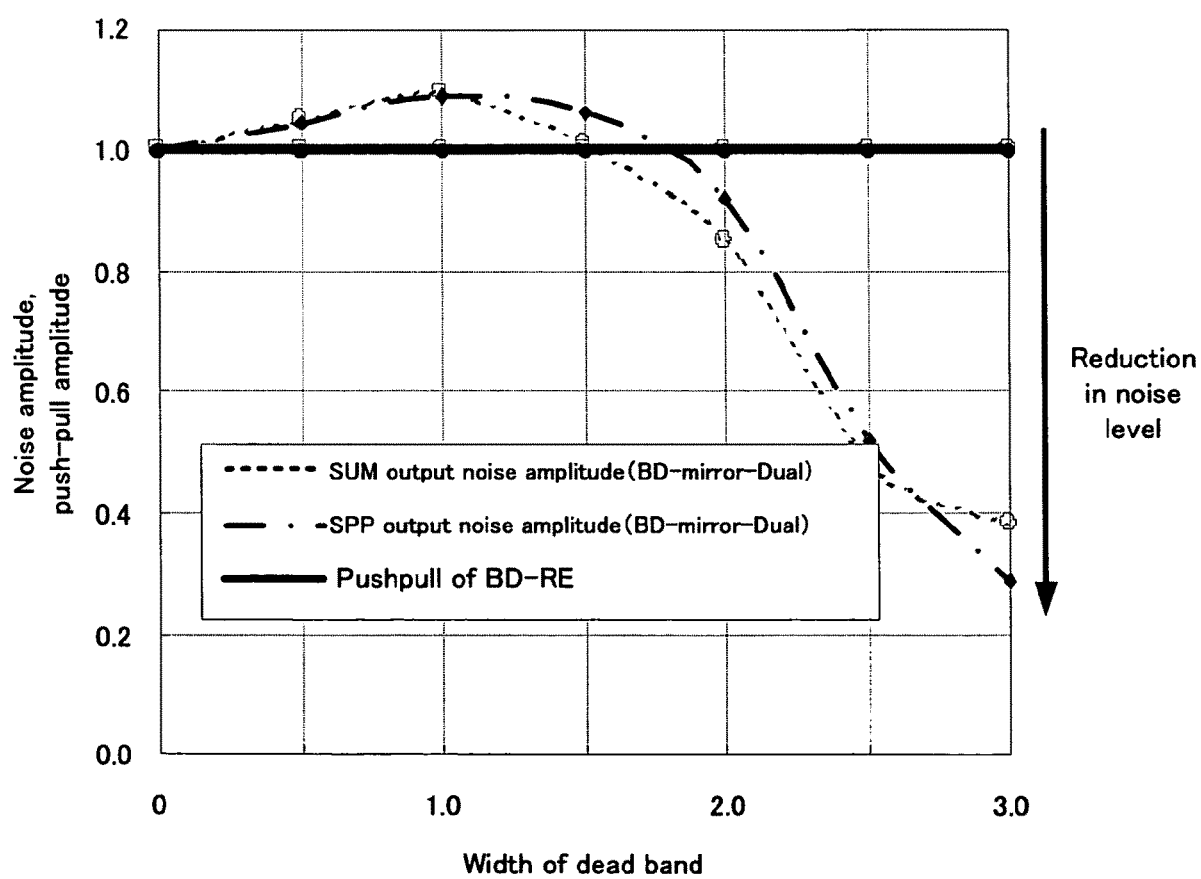

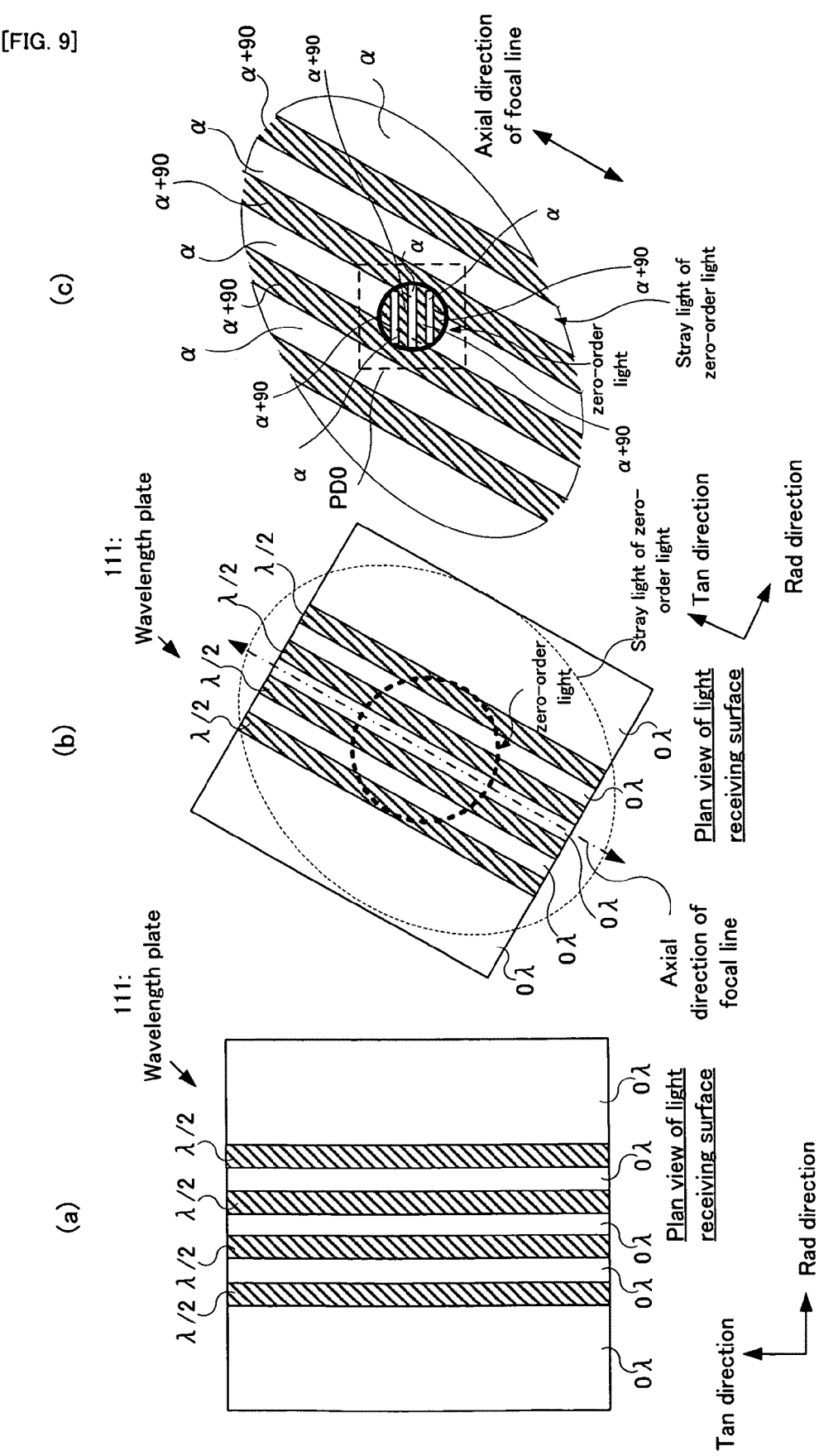

[FIG. 10]
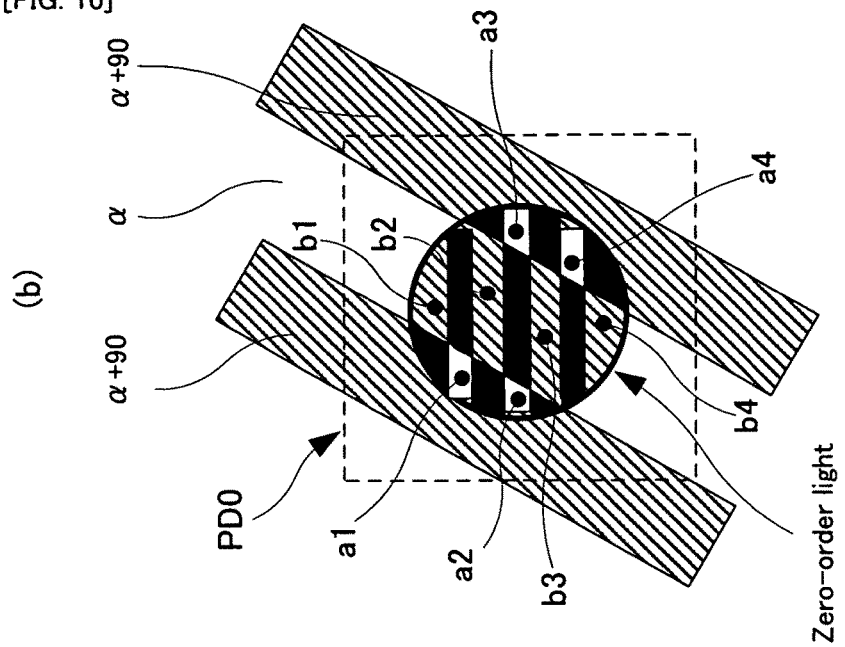
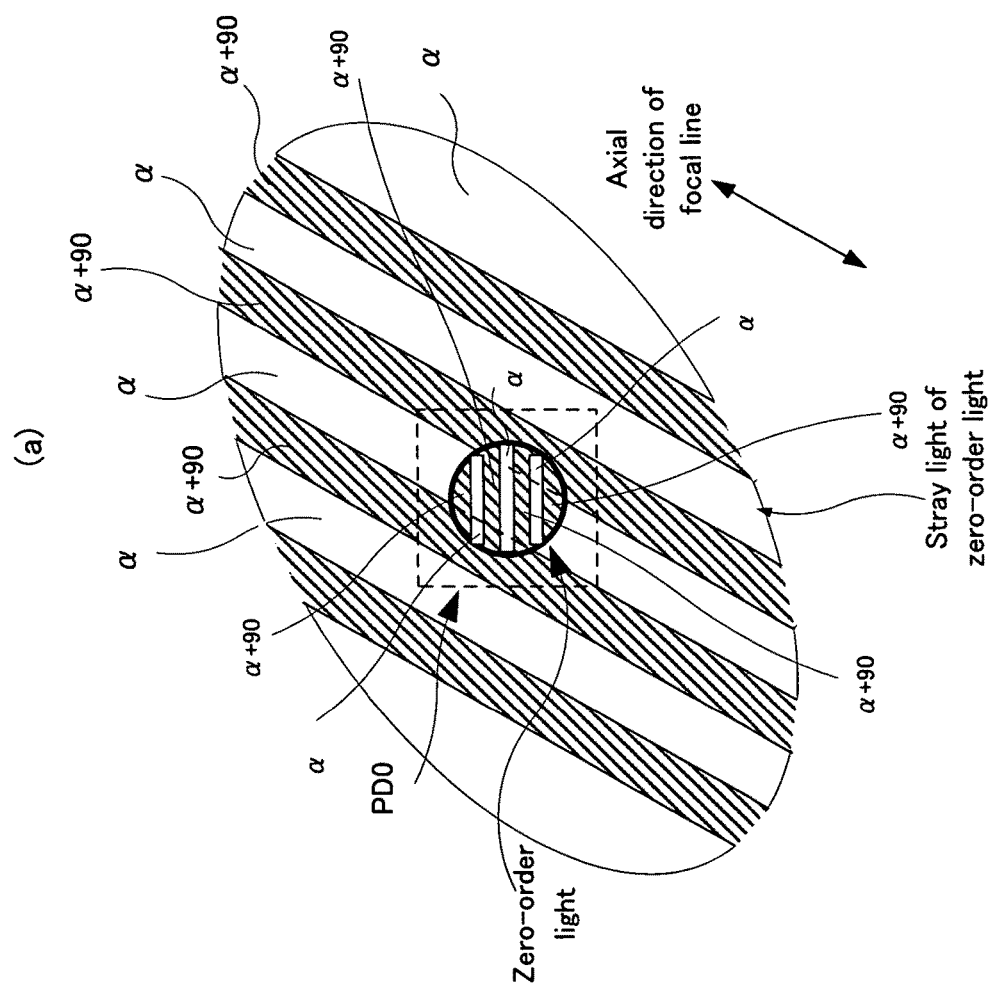

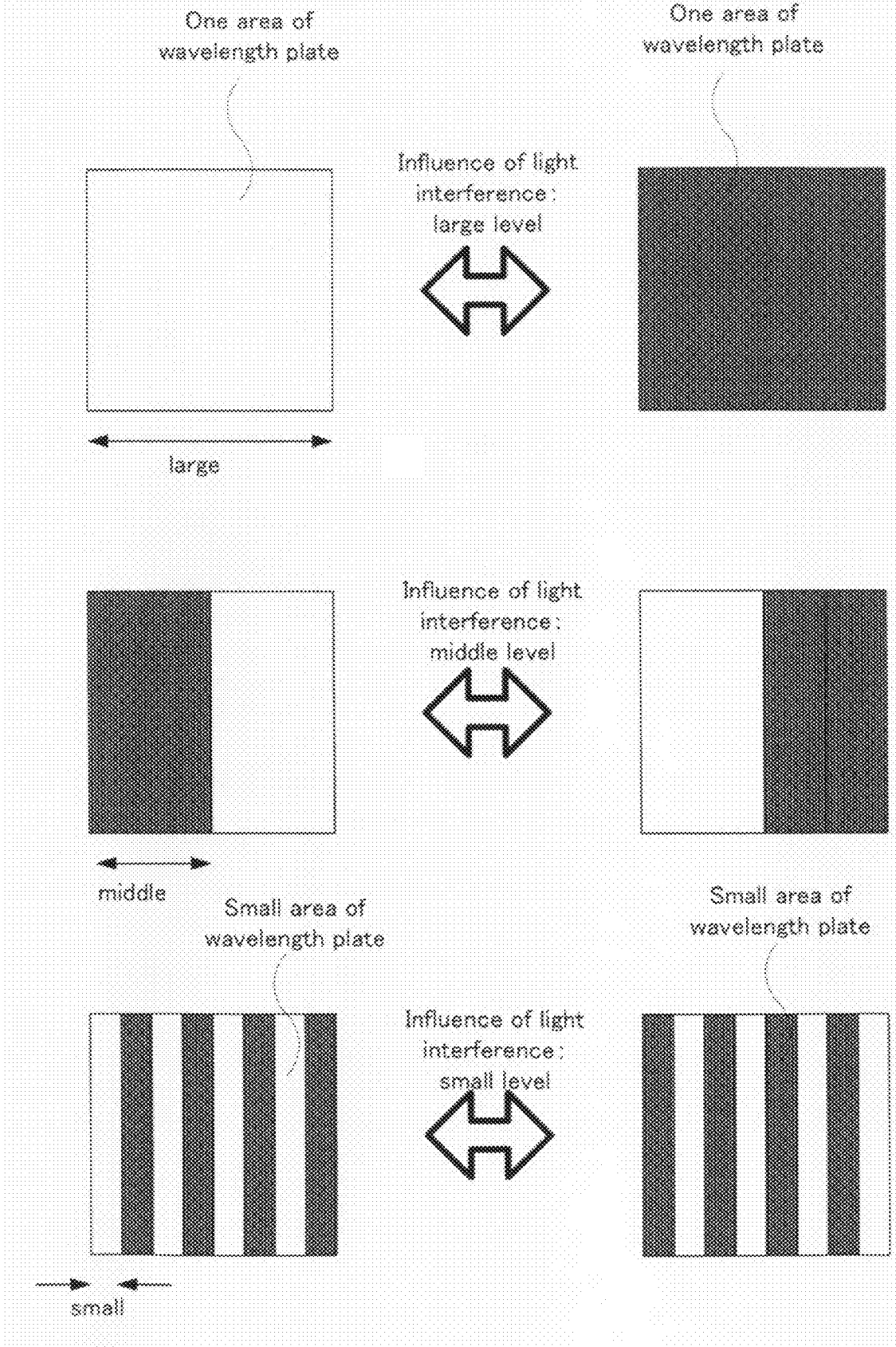
[FIG. 11]

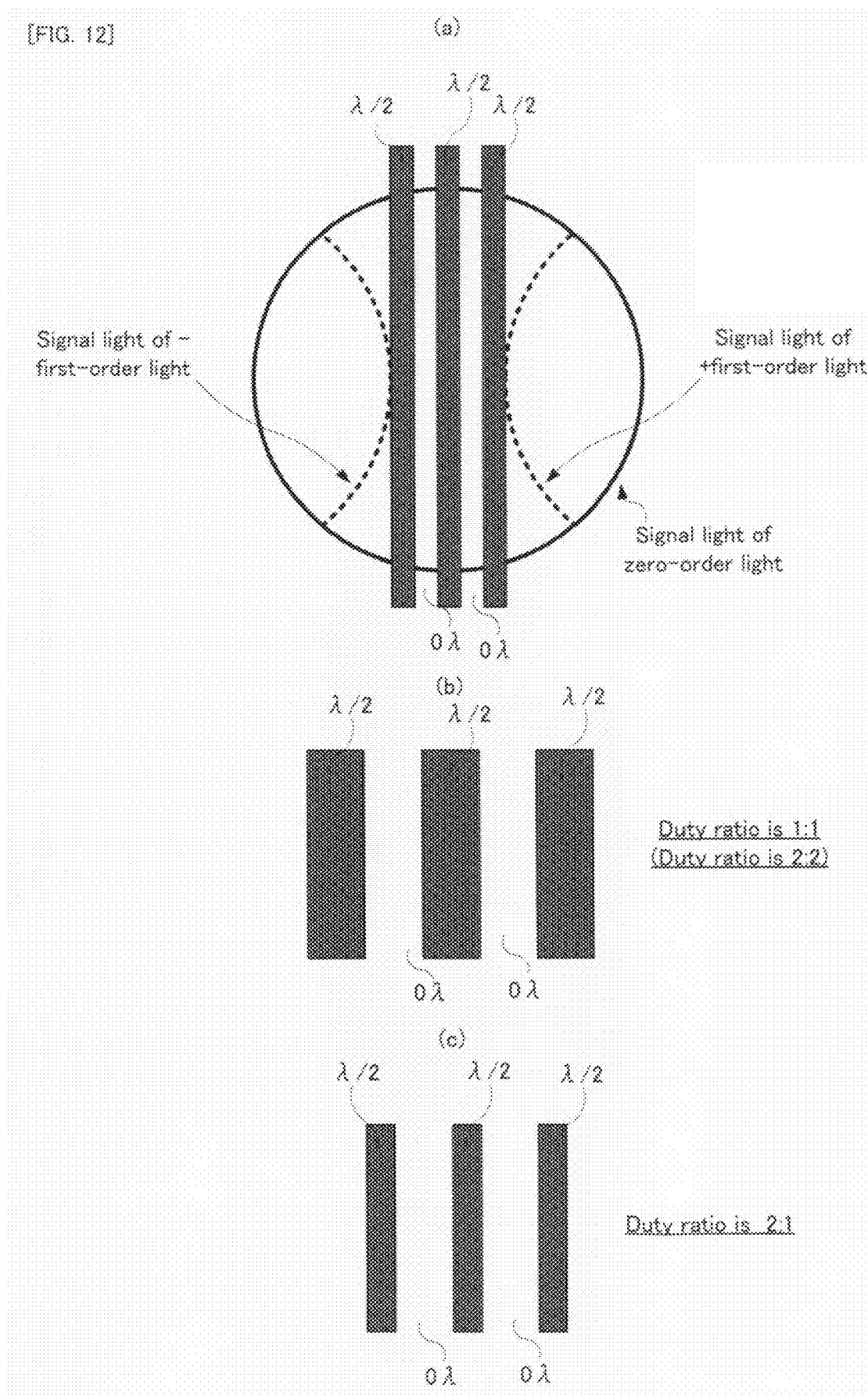

[FIG. 13]
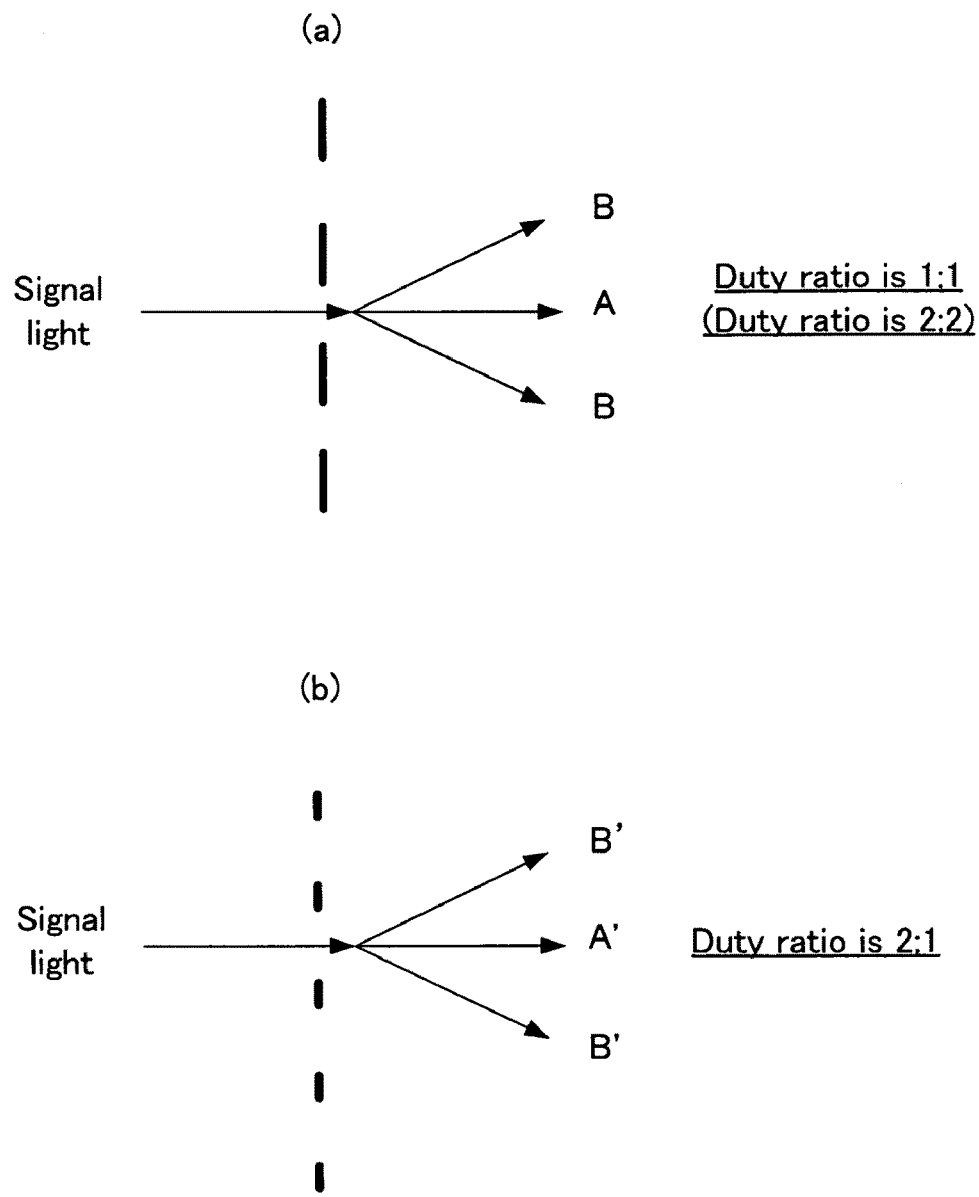

[FIG. 14]
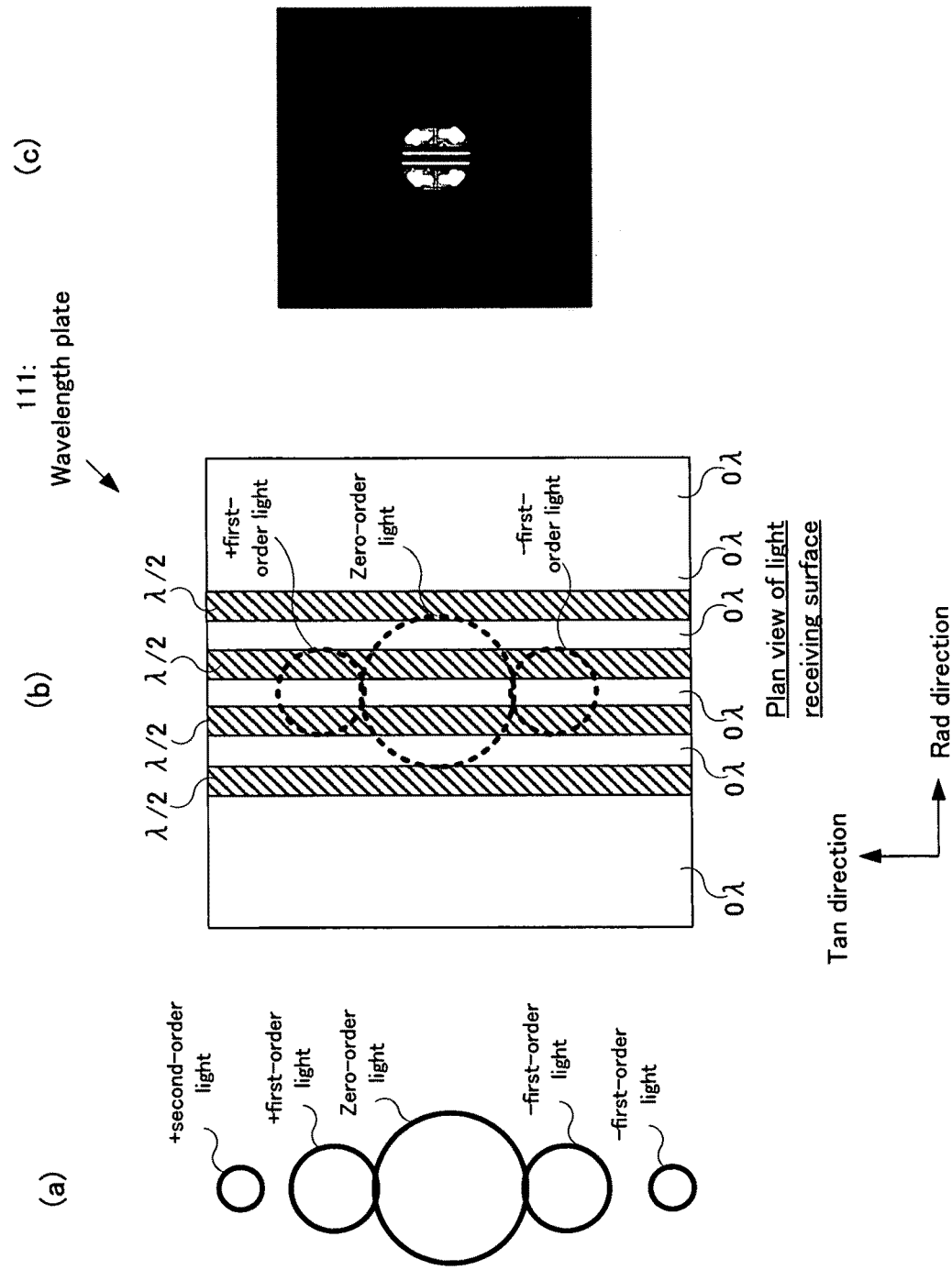

[FIG. 15]
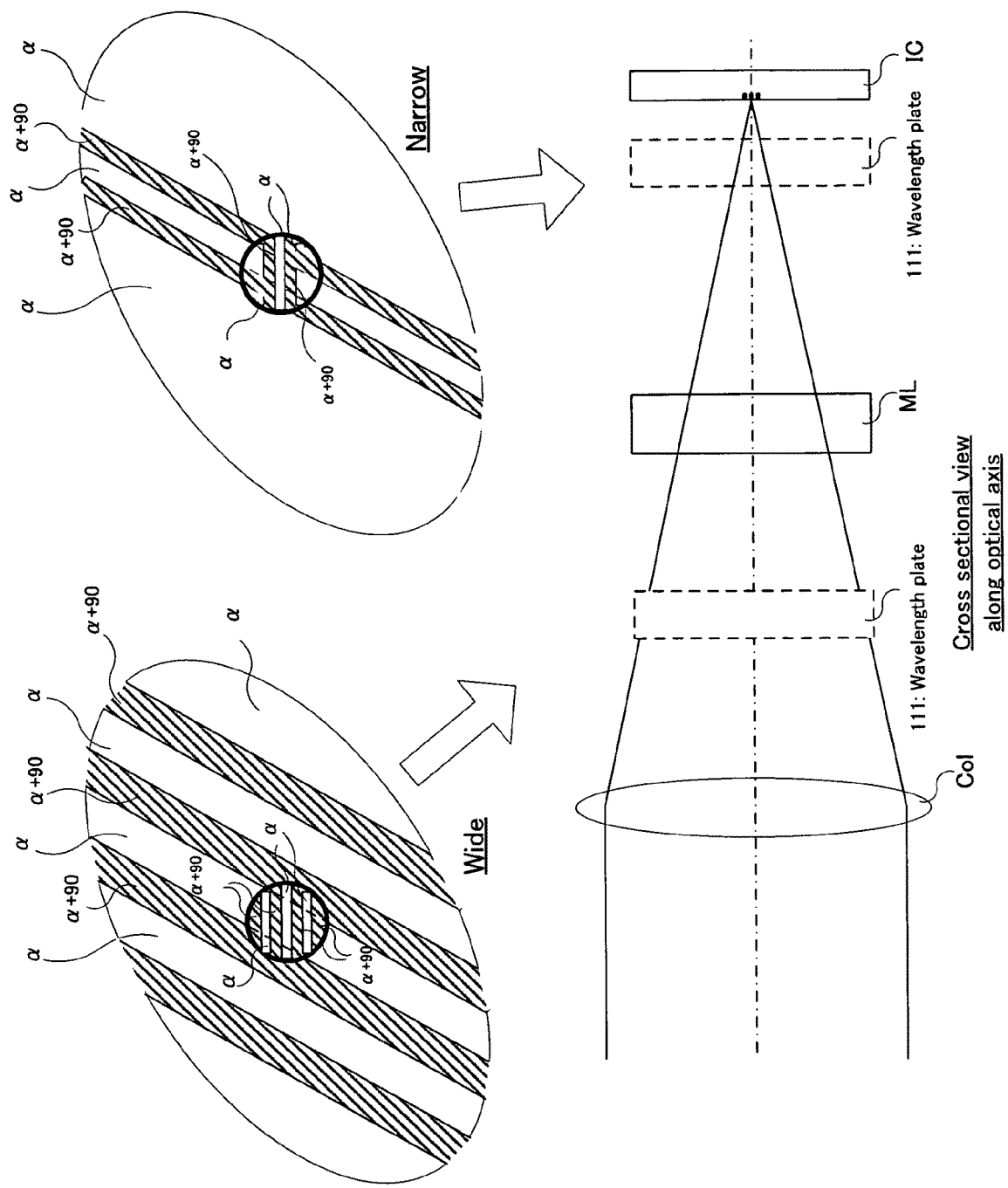

[FIG. 16]
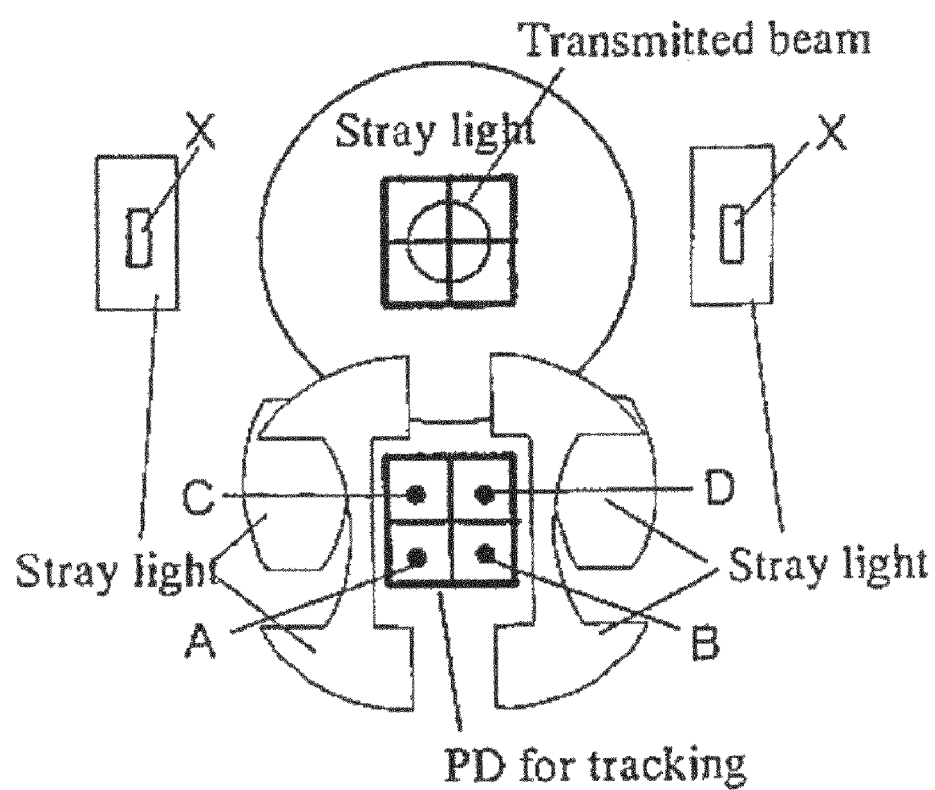

OPTICAL PICKUP AND INFORMATION DEVICE

This application is the U.S. national phase of International Application No. PCT/JP2007/056928, filed 29 Mar. 2007, which designated the U.S. and claims priority to Japanese Patent Application No. 2006-095908 filed 30 Mar. 2006, the entire contents of each of which are hereby incorporated by reference.

TECHNICAL FIELD

The present invention relates to an optical pickup for irradiating an information recording medium, such as a DVD, with a laser beam when an information signal is recorded or reproduced, and information equipment provided with the optical pickup.

BACKGROUND ART

For example, there has been developed an information recording medium, such as a multilayer type optical disc, for optically recording or reproducing an information signal (data) using a laser beam or the like. In such a multilayer type optical disc, if the interval between recording layers is large, a signal from the selected recording layer possibly deteriorates due to an influence of spherical aberration, so that the interval between recording layers tends to be narrowed. However, if the interval between recording layers is narrowed, because of so-called interlayer crosstalk, return light from the multilayer type optical disc includes not only a component of reflected light (hereinafter referred to as "signal light" as occasion demands) generated in a selected desired recording layer (hereinafter referred to as "one recording layer" as occasion demands) but also a component of reflected light (hereinafter referred to "stray light" as occasion demands) generated in another recording layer other than the one recording layer, at high level. Thus, a S/N ratio of the signal component of a reproduction signal or the like is possibly reduced, which possibly makes it hard to properly perform various controls, such as tracking control. Specifically, in general, it is known that the optical diameter of the signal light irradiated on a light receiving element (photo detector) (i.e. stability in an optical path within an optical pickup, and reliability in the control operation of the optical pickup) and the component of stray light have a relationship of tradeoff. Specifically, by increasing optical magnification and reducing an area of the light receiving element to be standardized, an influence of the stray light "Noise" to the signal level "Signal" is relatively reduced, by which the SN ratio (Signal to Noise Ratio) can be improved. However, the optical diameter of the signal light irradiated on the light receiving element is necessarily reduced, a position shift of the signal light is detected unnecessarily large, by the amount that the optical diameter of the signal light is reduced, if various signals, such as a tracking error signal, are generated in various divisional areas which constitute the light receiving element. Thus, it is necessary to adjust a mechanical, structural, and positional accuracy to be high in various actuators within the optical pickup, and to control the irradiation position of the signal light, highly accurately. That is, there is such a technical problem that the stability in the optical path within the optical pickup and the reliability in the control operation of the optical pickup are reduced.

Thus, for example, in a tracking method in the recording or reproduction of a dual-layer type Blu-ray disc, there has been suggested a technology for avoiding the stray light entering the light receiving element, by separating a push-pull signal from the signal light, using a hologram element. Alternatively, a patent document 1 discloses a technology of separating the reflected light from each recording layer highly accurately, using a difference in angle of the optical axis of the return light from each recording layer of the dual-layer type optical disc.

Patent document 1: Japanese Patent Application Laid Open NO. 2005-228436

DISCLOSURE OF INVENTION

Subject to be Solved by the Invention

However, with respect to the aforementioned, if the area of the light receiving element is increased, there is such a technical problem that the optical pickup is to be increased in size. Alternatively, in the various methods described above, there is such a technical problem that it is hard to properly reduce the influence of the stray light in response to an optical disc, such as a BD (Blu-ray Disc), having a smaller interlayer distance than the conventional one. Alternatively, in the various methods described above, the stray light enters the light receiving element for receiving a focus error signal (or RF signal) as shown in FIG. 16 (refer to overlap between "Stray light" and "Transmitted beam" in FIG. 16), so that there is such a technical problem that the S/N ratio of the signal component of the return light from the desired recording layer is reduced due to the influence of the stray light.

In view or the aforementioned problems, it is therefore an object of the present invention to provide an optical pickup capable of recording or reproducing an information signal with higher accuracy, while reducing an influence of stray light, in an information recording medium, such as a multilayer type optical disc, and information equipment provided with such an optical pickup.

Means for Solving the Subject (Optical Pickup)

The above object of the present invention can be achieved by an optical pickup for recording or reproducing an information signal with respect to an optical disc provided with a plurality of recording layers, each recording layer having a recording track in which information pits are arranged, the information signal being recorded in the information pits, the optical pickup provided with: a light source for irradiating a laser beam; a diffracting device (e.g. diffraction grating) for diffracting the irradiated laser beam; an optical system (e.g. half mirror, objective lens) for guiding the diffracted laser beam to one recording layer of the plurality of recording layers; an optical element (e.g. wavelength plate having an area divided in a lattice shape) which functions as an amplitude grating with respect to (i) signal light generated in the one recording layer and (ii) stray light generated in another recording layer of the plurality of recording layers, if the guided laser beam is focused on the one recording layer; and (iii) one or a plurality of light receiving devices (e.g. PD1a/PD1b/PD0) for receiving at least the signal light.

According to the optical pickup of the present invention, the laser beam irradiated from the light source is diffracted by the diffracting device, such as a diffraction grating, to zero-order light and diffraction light (e.g. so-called − or minus first-order diffraction light in addition to or instead of + or plus first-order diffraction light), for example. Then, by the optical system, such as an objective lens, a beam splitter, or a prism, it is guided to and focused on the one recording layer of the plurality of recording layers. At the same time, the signal light generated in the one recording layer, is received by the light receiving device. Thus, the laser beam guided to and focused on the one recording layer allows the information pits or marks formed in the one recording layer to be reproduced. Thus, it is possible to reproduce predetermined information from the optical disc. Alternatively, the focused laser beam allows the information pits or marks to be formed in the one recording layer. Thus, it is possible to record predetermined information onto the optical disc.

In particular, according to the present invention, the optical element functions as the amplitude grating with respect to (i) the signal light generated in the one recording layer and (ii) the stray light generated in the another recording layer of the plurality of recording layers. Here, the "amplitude grating" of the present invention is a so-called transmission diffraction grating or transmission type diffraction grating, which changes the amplitude of light (i.e. light intensity) on the basis of a predetermined spatial frequency, for example, with the light whose polarization direction is one direction as a reference.

Then, the signal light transmitted through the optical element which functions as the amplitude grating, is received by the light receiving device.

If the optical element does not function as the amplitude grating, an influence of light interference by the stray light increases in a relatively wide range, including a central portion of the optical diameter of the single light, for example.

In contrast, according to the present invention, the optical element functions as the amplitude grating, which reduces the influence of the light interference by the stray light on one portion of the signal light transmitted through the optical element. Therefore, the influence of light interference by the stray light on all the signal light, which is a assembly of the one portion of the signal light transmitted through the optical element, is reduced.

As a result, by virtue of the optical element which functions as the amplitude grating, it is possible to effectively reduce the influence of the light interference by the stray light on the signal light. In other words, because the light that receives the light interference by the stray light, is diffracted by the amplitude grating, the influence of the light interference is also dispersed and thus can be effectively reduced. As a result, it is possible to make the light receiving device receive the signal light, under the condition that the influence of the stray light is relatively reduced and the level of the light intensity (or the amplitude of the light corresponding to the light intensity) is maintained to be higher, for example, in the focus control and the tracking control on the multilayer type information recording medium, to thereby achieve the highly-accurate focus control and tracking control.

In one aspect of the optical pickup of the present invention, the optical element is the amplitude grating based on light intensity of either (i) light whose polarization direction is a first direction (e.g. α+90 degrees) or (ii) light whose polarization direction is a second direction (e.g. α degrees) which is different from the first direction.

According to this aspect, the optical element which functions as the amplitude grating, may be provided with one area and another area, on the basis of the predetermined spatial frequency, for example. The polarization direction in one portion of the signal light, transmitted through the one area, is changed to the first direction (e.g. α+90 degrees). At the same time, the polarization direction in one portion of the stray light, is also changed to the first direction. On the other hand, the polarization direction in another portion of the signal light, transmitted through the another area of the optical element which functions as the amplitude grating, is changed to the second direction (e.g. α degrees), which is different from the first direction. At the same time, the polarization direction in another portion of the stray light is also changed to the second direction.

Therefore, the light intensity based on the light whose polarization direction is the first direction, is defined on the basis of the one portion of the signal light and the one portion of the stray light, which are transmitted through the one area. In addition, the another portion of the signal light and the another portion of the stray light, which are transmitted through the another area hardly influences or does not influence at all the light intensity based on the light whose polarization direction is the first direction. Substantially in the same manner, the light intensity based on the light whose polarization direction is the second direction, is defined on the basis of the another portion of the signal light and the another portion of the stray light, which are transmitted through the another area. In addition, the one portion of the signal light and the one portion of the stray light, which are transmitted through the one area hardly influences or does not influence at all the light intensity based on the light whose polarization direction is the second direction.

As a result, since the optical element functions as the amplitude grating based on the light intensity in either the first direction or the second direction, it is possible to effectively reduce the influence of the light intensity by the stray light on the signal light.

In another aspect of the optical pickup of the present invention, in the optical element, (i) one or a plurality of first areas, which allow a polarization direction to be a first direction (e.g. α+90 degrees) both in one portion of the signal light generated in the one recording layer and in one portion of the stray light generated in the another recording layer of the plurality of recording layers (e.g. which allows the phase of a delay axis of a wavelength plate to be a first phase (e.g. α+180 degrees)), and (ii) one or a plurality of second areas, which allow a polarization direction to be a second direction (e.g. α degrees) both in another portion of the signal light and in another portion of the stray light (e.g. which allows the phase of the delay axis of the wavelength plate to be a second phase (e.g. α degrees)), are alternately formed along a reference direction, and the light receiving device receives (iii) the one portion of the signal light and the another portion of the stray light, or (iv) the another portion of the signal light and the one portion of the stray light.

According to this aspect, the optical element may be constructed by alternately forming the aforementioned one or plurality of first areas and the aforementioned one and plurality of second areas, along the reference direction, on the basis of the predetermined spatial frequency, for example. The polarization direction in the one portion of the signal light transmitted through the first area, is changed to the first direction (e.g. α+90 degrees). At the same time, the polarization direction in the one portion of the stray light, is also changed to the first direction. On the other hand, the polarization direction in the another portion of the signal light, transmitted through the second area of the optical element which functions as the amplitude grating, is changed to the second direction (e.g. α degrees) which is different from the first direction. At the same time, the polarization direction in the another portion of the stray light is also changed to the second direction.

Then, on the light receiving device, (i) the one portion of the signal light whose polarization direction is the first direction and (ii) the another portion of the stray light whose polarization direction is the second direction are received together.

Therefore, it is possible to effectively reduce the influence of the light interference in (i) the one portion of the signal light and (ii) the another portion of the stray light excluding the one portion of the stray light, for example, in which the polarization directions are different. In particular, by making the polarization directions be different in the signal light of the zero-order light and the stray light of the diffraction light, it is possible to remarkably reduce (or limit) the influence of the light interference by the stray light, on the light receiving device for receiving the zero-order light.

As a result, it is possible to make the light receiving device receive the signal light, under the condition that the influence of the stray light is effectively reduced and the level of the light intensity (or the amplitude of a push-pull signal corresponding to the light intensity) is maintained to be higher, for example, in the tracking control based on a one-beam or three-beam method on the multilayer type information recording medium, to thereby achieve the highly-accurate tracking control.

In an aspect associated with the optical element described above, the reference direction may be defined on the basis of a radial direction of the optical disc (a direction for receiving a push-pull signal: Rad direction).

By virtue of such construction, it is possible to make the light receiving device receive the signal light, under the condition that the influence of the stray light is effectively reduced and the level of the light intensity is maintained to be higher, for example, in the tracking control based on the one-beam method on the multilayer type information recording medium, to thereby achieve the highly-accurate tracking control.

In an aspect associated with the optical element described above, the reference direction may cross, at a right angle, the polarization direction of the signal light which enters the optical element.

By virtue of such construction, it is possible to highly accurately achieve the amplitude grating, (i) which highly accurately and efficiently transmits the light having the polarization direction in one direction which crosses the reference direction at a right angle and (ii) which is based on the light intensity of the light having the polarization direction in the one direction.

In an aspect associated with the optical element described above, the optical pickup may be further provided with a cylindrical lens (multi lens) for performing an astigmatic method, and the reference direction may be defined on the basis of a cylinder direction of the cylindrical lens.

By virtue of such construction, it is possible to receive at least one portion of the signal light and another portion of the stray light, in which the polarization directions are different, properly together. Specifically, a most part or all of the signal light may be received, with it included in another portion of the stray light, by the light receiving device. Therefore, it is possible to more effectively reduce the influence of the light interference between (i) the at least one portion of the signal light and (ii) the another portion of the stray light excluding at least one portion of the stray light, in which the polarization directions are different.

In an aspect associated with the optical element described above, the first direction and the second direction may have polarization surfaces which are relatively different by 90 degrees.

By virtue of such construction, it is possible to more effectively reduce the influence of the light interference between (i) the at least one portion of the signal light and (ii) the another portion of the stray light excluding at least one portion of the stray light, in which the polarization directions are relatively different by 90 degrees.

In an aspect associated with the optical element described above, at least one of the first area and the second area may be a $\lambda/2$ wavelength plate.

By virtue of such construction, it is possible to more effectively reduce the influence of the light interference between (i) the at least one portion of the signal light and (ii) the another portion of the stray light excluding at least one portion of the stray light, in which the polarization directions are relatively different by 90 degrees.

In an aspect associated with the optical element described above, if a spatial frequency in which the plurality of first areas and the plurality of second area are alternately formed, is relatively large, the optical element may be disposed relatively close to the light receiving device.

By virtue of such construction, the optical element based on the relatively large spatial frequency, can be disposed close to the light receiving element, so that it is possible to achieve a saved space.

In an aspect associated with the optical element described above, if a spatial frequency in which the plurality of first areas and the plurality of second area are alternately formed, is relatively small, the optical element may be disposed relatively far from the light receiving device.

By virtue of such construction, it is possible to reduce needs for small parts and precision machining, on the basis of the relatively small spatial frequency of the optical element, so that it is possible to simplify a process of manufacturing the wavelength plate.

In an aspect associated with the optical element described above, a width in which the first area and the second area are formed, may be defined on the basis of (i) an area or a shape of an area in which an influence of the stray light is relatively large in an optical diameter of the signal light and (ii) a position of a center of the optical diameter of the signal light.

By virtue of such construction, on the basis of various parameters of the optical diameter of the signal light, it is possible to receive the at least one portion of the signal light and the another portion of the stray light, in which the polarization directions are different, properly together, on the basis of the size of the area or the shape of the area in which the influence of the stray light is relatively large, by virtue of the light receiving device. Here, the "optical diameter" of the present invention means a physical length, such as a diameter (or radius), which can be measured on the basis of the optical axis of the laser beam. In particular, the "optical diameter" may be uniquely determined on the basis of the optical features (e.g. optical magnification, diffraction angle, position of a main point, or focal point length, etc.) in another optical system, such as a condenser lens. Specifically, a most part or all of the signal light may be received, with it included in the another portion of the stray light, by the light receiving device. Therefore, it is possible to more effectively reduce the influence of the light interference between (i) the at least one portion of the signal light and (ii) the another portion of the stray light excluding the at least one portion of the stray light, in which the polarization directions are different.

In an aspect associated with the optical element described above, (i) a minimum value of a width in which the first area and the second area are formed, may be defined on the basis of a size of an area or a shape of an area in which an influence of the stray light is relatively large in an optical diameter of the signal light and (ii) a maximum value of the width may be defined on the basis of a diffraction angle and an optical diameter of a diffraction light component of the signal light.

By virtue of such construction, on the basis of the minimum value of the width in which the first area and the second area are formed, it is possible to more effectively reduce the influence of the light interference between (i) the at least one portion of the signal light and (ii) the another portion of the stray light excluding the at least one portion of the stray light, in which the polarization directions are different. In addition, on the basis of the maximum value of the width in which the first area and the second area are formed, it is possible to make the light receiving device receive the signal light, under the condition that the influence of the stray light is effectively reduced and the level of the light intensity is maintained to be higher, for example, in the focus control and the tracking control based on the one-beam or three-beam method on the multilayer type information recording medium, to thereby achieve the highly-accurate tracking control.

In an aspect associated with the optical element described above, (i) the first area with a predetermined width and (ii) the two second areas which sandwich the first area therebetween, may be formed in the optical element.

By virtue of such construction, it is possible to achieve the optical element of the present invention, using less constituent elements having the one area and the two areas, for example.

In an aspect associated with the optical element described above, the plurality of first areas and the plurality of second areas may be alternately formed in the optical element, in an entire area in which the signal light or the stray light is transmitted through the optical element.

By virtue of such construction, it is possible to determine the placement or position of the optical element, only on the basis of the optical axis, more easily, simply, and properly.

In an aspect associated with the optical element described above, the plurality of first areas and the plurality of second areas may be alternately formed, on the basis of a predetermined spatial frequency.

By virtue of such construction, it is possible to achieve the optical element of the present invention, more highly accurately, on the basis of the predetermined spatial frequency.

In an aspect associated with the optical element described above, a spatial frequency in which the plurality of first areas and the plurality of second areas are alternately formed, may be defined to be relatively large, on the basis of light intensity of a zero-order light component of the signal light.

By virtue of such construction, on the basis of the spatial frequency defined to be relatively large, it is possible to make the light receiving device receive the signal light, under the condition that the influence of the stray light is effectively reduced and the level of the light intensity is maintained to be higher, for example, in the focus control and the tracking control based on the one-beam or three-beam method on the multilayer type information recording medium, to thereby achieve the highly-accurate focus control and tracking control.

In an aspect associated with the optical element described above, a spatial frequency in which the plurality of first areas and the plurality of second areas are alternately formed, may be defined to be relatively small, on the basis of light intensity of ±first-order light components of the signal light.

By virtue of such construction, on the basis of the spatial frequency defined to be relatively small, it is possible to make the light receiving device receive the signal light, under the condition that the influence of the stray light is effectively reduced and the level of the light intensity is maintained to be higher, for example, in the tracking control based on the three-beam method on the multilayer type information recording medium, to thereby achieve the highly-accurate tracking control.

In an aspect associated with the optical element described above, a spatial frequency in which the plurality of first areas and the plurality of second areas are alternately formed, may be defined, on the basis of a spatial frequency with a Duty ratio of 1:1.

By virtue of such construction, on the basis of the spatial frequency with a Duty ratio of 1:1, it is possible to make the light receiving device receive the signal light, under the condition that the influence of the stray light is effectively reduced and the level of the light intensity is maintained to be higher, for example, in the focus control and the tracking control based on the one-beam or three-beam method on the multilayer type information recording medium, to thereby achieve the highly-accurate focus control and tracking control.

In an aspect associated with the optical element described above, a spatial frequency in which the plurality of first areas and the plurality of second areas are alternately formed, may be defined, on the basis of a spatial frequency with a Duty ratio of n:m (wherein n and m are natural numbers).

By virtue of such construction, on the basis of the spatial frequency with a Duty ratio of n:m, it is possible to make the light receiving device receive the signal light, under the condition that the influence of the stray light is effectively reduced and the level of the light intensity is maintained to be higher, for example, in the focus control and the tracking control based on the one-beam or three-beam method on the multilayer type information recording medium, to thereby achieve the highly-accurate focus control and tracking control.

In an aspect associated with the optical element described above, the optical element differentiate the polarization direction of a diffraction light component of the signal light (±first-order light, zero-order light) and the polarization direction of the stray light, and the light receiving device includes at least a second light receiver and a third receiver, of a first light receiver (PD0) for receiving a zero-order light component of the signal light, the second light receiver (PD1a) for receiving a +first-order light component, and the third light receiver (PD1b) for receiving a −first-order light component.

By virtue of such construction, using the light receiving device including the second light receiver and the third light receiver, it is possible to receive (i) the at least one portion of the signal light corresponding to the ±first-order diffraction light and (ii) the another portion of the stray light corresponding to the zero-order light, in which the polarization directions are different, properly together.

In an aspect associated with the optical element described above, it may be further provided with a controlling device (e.g. tracking control/focus control) for controlling the optical system to guide the laser beam to the recording track provided for the one recording layer, on the basis of the received signal light.

By virtue of such construction, for example, under the control of the controlling device for performing the tracking control or focus control, it is possible to make the light receiving device receive the light, under the condition that the influence of the stray light is effectively reduced and the level of the light intensity is maintained to be higher, for example, on the multilayer type information recording medium, to thereby achieve the highly-accurate focus control and tracking control.

(Information Equipment)

The above object of the present invention can be also achieved by an information equipment provided with: the optical pickup of the present invention described above (incidentally including its various aspects); and a recording/reproducing device for irradiating the optical disc with the laser beam, to thereby perform the recording or reproduction of the information signal.

According to the information equipment of the present invention, it is possible to record the information signal onto the optical disc or to reproduce the information signal recorded on the optical disc, while receiving the same various benefits as those of the optical pickup of the present invention described above.

These effects and other advantages of the present invention will become more apparent from the embodiments explained below.

As explained above, according to the optical pickup of the present invention, it is provided with the light source, the diffracting device, the optical system, the optical element, and the light receiving device. As a result, it is possible to make the light receiving device receive the signal light, under the condition that the influence of the stray light is relatively reduced and the level of the light intensity (or the amplitude of the light corresponding to the light intensity) is maintained to be higher, for example, in the focus control and the tracking control on the multilayer type information recording medium, to thereby achieve the highly-accurate focus control and tracking control.

Alternatively, according to the information equipment of the present invention, it is provided with the light source, the diffracting device, the optical system, the optical element, the light receiving device, and the recording/reproducing device. As a result, it is possible to make the light receiving device receive the signal light, under the condition that the influence of the stray light is relatively reduced and the level of the light intensity (or the amplitude of the light corresponding to the light intensity) is maintained to be higher, for example, in the focus control and the tracking control on the multilayer type information recording medium, to thereby achieve the highly-accurate focus control and tracking control.

BRIEF DESCRIPTION OF DRAWINGS

FIG. 1 is a block diagram showing the basic structure of an information recording/reproducing apparatus in an embodiment of the information recording apparatus of the present invention and a host computer.

FIG. 2 is a block diagram conceptually showing the more detailed structure of an optical pickup 100 provided for an information recording/reproducing apparatus 300 in the embodiment.

FIG. 3 is one schematic diagram conceptually showing light interference of signal light and stray light within a general optical pickup.

FIG. 4 is another schematic diagram conceptually showing the light interference of the signal light and the stray light within the general optical pickup.

FIG. 5 are a plan view (FIG. 5(a)) showing, by dark and light colors, the light intensity if the light interference does not occur in a optical diameter of light received on a light receiving device within the general optical pickup, and a plan view (FIG. 5(b)) showing, by dark and light colors, the light intensity, if the light interference occurs in the optical diameter of the light received on the light receiving device within the general optical pickup.

FIG. 6 are a plan view (FIG. 6(a)) schematically showing a light receiving surface of a wavelength plate provided for the optical pickup in the embodiment, and a cross sectional view (FIG. 6(b)) schematically showing the location of the wavelength plate.

FIG. 7 are schematic diagrams (FIG. 7(a) and FIG. 7(b)) schematically showing an optical function as an amplitude grating of the wavelength late provided for the optical pickup in the embodiment, and a schematic diagram (FIG. 7(c)) schematically showing an optical function as a phase grating of the wavelength plate.

FIG. 8 are a plan view (FIG. 8(a)) showing, by dark and light colors, the light intensity if the light interference occurs in the optical diameter of the light received on the light receiving device within the optical pickup in the embodiment, a plan view (FIG. 8(b)) showing a relationship between the optical diameter of the light received on the light receiving device within the optical pickup in the embodiment and the width of a dead band, and a table (FIG. 8(c)) showing a relationship between the width of the dead band and a noise level in the embodiment.

FIG. 9 are a plan view (FIG. 9(a)) schematically showing the light receiving surface of the wavelength plate in the embodiment, a plan view (FIG. 9(b)) schematically showing a relative positional relationship between the optical diameter in which zero-order light is irradiated and the optical diameter in which ±first-order light is irradiated, on the light receiving surface of the wavelength plate, and a plan view (FIG. 9(c)) schematically showing a relative positional relationship among the optical diameter in which zero-order light is irradiated, the optical diameter in which ±first-order light is irradiated, and the optical diameter in which zero-order stray light is irradiated, on the light receiving surface of the light receiving device.

FIG. 10 are a plan view and an enlarged plan view (FIG. 10(a) and FIG. 10(b)) schematically showing a positional relationship among various components in the optical diameter in which zero-order light is irradiated, on the light receiving surface of the light receiving device in the embodiment.

FIG. 11 is a schematic diagram schematically showing a correlation between the level of the light interference and the function as the amplitude grating on the wavelength plate in the embodiment.

FIG. 12 are a plan view (FIG. 12(a)) schematically showing the light receiving surface of the wavelength plate provided for the optical pickup in another embodiment, and plan views (FIG. 12(b) and FIG. 12(c)) schematically showing a Duty ratio of the light receiving surface of the wavelength plate.

FIG. 13 are a schematic view (FIG. 13(a)) schematically showing a ratio of dispersion of light intensity of the signal light corresponding to a Duty ratio (1:1) and a schematic view (FIG. 13(b)) schematically showing a ratio of dispersion of light intensity of the signal light corresponding to a Duty ratio (2:1), in another embodiment.

FIG. 14 are a plan view (FIG. 14(a)) schematically showing a relative magnitude and a relative positional relationship between the optical diameter of zero-order light and the optical diameter of first-order light, a plan view (FIG. 14(b)) schematically showing the light receiving surface of the wavelength plate, and a plan view (FIG. 14(c)) schematically showing, by dark and light colors, the distribution of the light intensity in the if the optical diameters of zero-order light and ±first-order light, in another embodiment.

FIG. 15 is a cross sectional view along an optical axis schematically showing the placement of the wavelength plate, provided for the optical pickup in another embodiment.

FIG. 16 is a plan view showing a relative positional relationship between a light receiving device and an optical diameter in a comparison example

DESCRIPTION OF REFERENCE CODES 10 optical disc
100 optical pickup
101 semiconductor laser
102 diffraction grating
103 etc. condenser lens
105 optical path branch element
107 ¼ wavelength plate
110 cylindrical lens
111 etc. wavelength plate
PD0 etc. light receiving device
300 information recording/reproducing apparatus
302 signal recording/reproducing device

BEST MODE FOR CARRYING OUT THE INVENTION

Hereinafter, the best mode for carrying out the invention will be explained in each embodiment in order, with reference to the drawings.

(1) Embodiment of Information Recording/Reproducing Apparatus

Firstly with reference to FIG. 1, a detailed explanation will be given on the structure and operation of an information recording apparatus in an embodiment of the present invention. In particular, in the embodiment, the information recording apparatus of the present invention is applied to an information recording/reproducing apparatus for an optical disc.

(1-1) Basic Structure

Firstly, with reference to FIG. 1, an explanation will be given on the basic structure of an information recording/reproducing apparatus 300 in an embodiment of the information recording apparatus of the present invention and a host computer 400. FIG. 1 is a block diagram showing the basic structure of the information recording/reproducing apparatus in the embodiment of the information recording apparatus of the present invention and the host computer. Incidentally, the information recording/reproducing apparatus 300 has a function of recording record data onto an optical disc 10 and a function of reproducing the record data recorded on the optical disc 10.

As shown in FIG. 1, the inner structure of the information recording/reproducing apparatus 300 will be explained. The information recording/reproducing apparatus 300 is an apparatus for recording information onto the optical disc 10 and for reading the information recorded on the optical disc 10, under the control of a CPU (Central Processing Unit) 314 for drive.

The information recording/reproducing apparatus 300 is provided with: the optical disc 10; an optical pickup 100; a signal recording/reproducing device 302; an address detection device 303; the CPU (drive control device) 314; a spindle motor 306; a memory 307; a data input/output control device 308; and a bus 309.

Moreover, the host computer 400 is provided with: a CPU (host control device) 401; a memory 402; an operation control device 403; an operation button 404; a display panel 405; a data input/output control device 406; and a bus 407.

In particular, the information recording/reproducing apparatus 300 may be constructed to communicate with an external network by housing the host computer 400 equipped with a communication device, such as a modem, in the same case. Alternatively, the information recording/reproducing apparatus 300 may be constructed to communicate with an external network by that the CPU (host control device) 401 of the host compute 400 equipped with a communication device, such as an i-link, controls the information recording/reproducing apparatus 300 directly through the data input/output control device 308 and the bus 309.

The optical pickup 100 is to perform the recording/reproducing with respect to the optical disc 10, and is provided with a semiconductor laser apparatus and a lens. More specifically, the optical pickup 100 irradiates the optical disc 10 with a light beam, such a laser beam, as reading light with a first power upon reproduction, and as writing light with a second power with it modulated upon recording.

The signal recording/reproducing device 302 performs the recording/reproducing with respect to the optical disc 10 by controlling the optical pickup 100 and the spindle motor 306. More specifically, the signal recording/reproducing device 302 is provided with a laser diode driver (LD driver), a head amplifier, and the like. The LD driver drives the not-illustrated semiconductor laser built in the optical pickup 100. The head amplifier amplifies the output signal of the optical pickup 100, i.e., the reflected light of the laser beam, and outputs the amplified signal. More specifically, the signal recording/reproducing device 302 drives the not-illustrated semiconductor laser built in the optical pickup 100 so as to determine an optimum laser power by the processes of recording and reproducing an OPC pattern, together with a not-illustrated timing generator or the like, under the control of the CPU 314, in an OPC (Optimum Power Control) process. In particular, the signal recording/reproducing device 302 constitutes one example of the "recording/reproducing device" of the present invention, with the optical pickup 100.

The address detector 303 detects an address (address information) on the optical disc 10 from a reproduction signal including e.g. a pre-format address signal or the like, outputted by the signal recording/reproducing device 302.

The CPU (drive control device) 314 controls the entire information recording/reproducing apparatus 300 by giving instructions to various devices, through the buss 309. Incidentally, software or firmware for operating the CPU 314 is stored in the memory 30. In particular, the CPU 314 constitutes one example of the "controlling device" of the present invention.

The spindle motor 306 is to rotate and stop the optical disc 10, and operates in accessing the optical disc 10. More specifically, the spindle motor 306 is constructed to rotate the optical disc 10 at a predetermined speed and stop it, under the spindle servo provided by a not-illustrated servo unit or the like.

The memory 307 is used in the general data processing and the OPC process on information recording/reproducing apparatus 300, including a buffer area for the record/reproduction data, an area used as an intermediate buffer when data is converted into the data that can be used on the signal recording/reproducing device 302, and the like. Moreover, the memory 307 is provided with: a ROM area in which a program for performing an operation as a recording device, i.e., firmware, is stored; a buffer for temporarily storing the record/reproduction data; a RAM area in which a parameter required for the operation of the firmware program or the like is stored; and the like.

The data input/output control device 308 controls the data input/output from the exterior with respect to the information recording/reproducing apparatus 300, and stores the data into or extracts it from a data buffer on the memory 307. A drive control command, which is issued from the external host computer 400 connected to the information recording/reproducing apparatus 300 via an interface, such as a SCSI (Small Computer System Interface) and an ATAPI (AT Attachment Packet Interface), is transmitted to the CPU 314 through the data input/output control device 308. Moreover, the record/reproduction data is also exchanged with the host computer 400 through the data input/output control device 308.

The CPU (host control device) 401, the memory 402, the data input/output control device 406, and the bus 407 of the host computer 400 are substantially the same as the corresponding constituent elements in the information recording/reproducing apparatus 300.

The operation control device 403 performs the reception of the operation instruction and display with respect to the host computer 400. The operation control device 403 sends the instruction to perform the recording or reproduction, using the operation bottom 401, to the CPU 401. The CPU 401 may send a control command to the information recording/reproducing apparatus 300 through the input/output control device 406 on the basis of the instruction information from the operation/display control device 403, to thereby control the entire information recording/reproducing apparatus 300. In the same manner, the CPU 401 can send a command of requiring the information recording/reproducing apparatus 300 to send the operational state to the host, to the information recording/reproducing apparatus 300. By this, it is possible to recognize the operational state of the information recording/reproducing apparatus 300, such as during recording and during reproduction. Thus, the CPU 401 can output the operational state of the information recording/reproducing apparatus 300, to the display panel 405, such as a fluorescent tube and a LCD, through the operation control device 403.

One specific example in which the information recording/reproducing apparatus 300 and the host computer 400, as explained above, are used together is household equipment, such as recorder equipment for recording/reproducing a video. The recorder equipment is equipment for recording a video signal from a broadcast reception tuner and an external connection terminal, onto a disc, and for outputting the video signal reproduced from the disc, to external display equipment, such as a television. The operation as the recorder equipment is performed by executing a program stored in the memory 402, on the CPU 401. Moreover, in another specific example, the information recording/reproducing apparatus 300 is a disc drive (hereinafter referred to as a drive, as occasion demands), and the host computer 400 is a personal computer or a workstation. The host computer 400, such as the personal computer, and the disc drive are connected to each other through the data input/output control devices 308 and 406, such as the SCSI and the ATAPI. An application, such as writing software, which is installed in the host computer, controls the disc drive.

(2) Optical Pickup (2-1) Basic Structure of Optical Pickup

Next, with reference to FIG. 2, a more detailed explanation will be given on the optical pickup 100 provided for the information recording/reproducing apparatus 300 in the embodiment. FIG. 2 is a block diagram conceptually showing the more detailed structure of the optical pickup 100 provided for the information recording/reproducing apparatus 300 in the embodiment.

As shown in FIG. 2, the optical pickup 100 is provided with: a semiconductor laser 101 (i.e. one specific example of the light source of the present invention); a diffraction grating 102 (i.e. one specific example of the diffracting device of the present invention); a condenser lens (e.g. collimator lens) 103; an optical path branch element (e.g. half mirror) 105; a reflection mirror 106; a ¼ wavelength plate 107; a condenser lens 108; a condenser lens 109; a cylindrical lens 110; a wavelength plate 111; a light receiving device (or photo detector) PD0; a light receiving device (or photo detector) PD1a; and a light receiving device (or photo detector) PD1b. Therefore, a laser beam LB is emitted from the semiconductor laser 101 in the following order and is received by the light receiving device PD0 or the like through each element. That is, if it is guided to one recording layer of the optical disc as a so-called outward on the optical path, the laser beam LB emitted from the semiconductor laser 101 is guided to the one recording layer through the diffraction grating 102, the condenser lens 103, an optical functional element 104, the optical path branch element 105, the reflection mirror 106, the ¼ wavelength plate 107, and the condenser lens 108. On the other hand, as a so-called homeward on the optical path, the laser beam LB reflected by the one recording layer, is received on the light receiving device PD0 through the condenser lens 108, the ¼ wavelength plate 107, the reflection mirror 106, the optical path branch element 105, the condenser lens 109, and the cylindrical lens 110.

Incidentally, the condenser lenses 103, 108, and 109, the optical path branch element 105, the reflection mirror 106, the ¼ wavelength plate 107, and the cylindrical lens 110 constitute one specific example of the optical system of the present invention. Moreover, the light receiving devices PD0, PD1a, and PD1b constitute one specific example of the light receiving device of the present invention.

The semiconductor laser 101 emits the laser beam LB in an elliptical light emission pattern which enlarges more in a perpendicular direction than in a horizontal direction, for example.

The diffraction grating 102 diffracts the laser beam emitted from the semiconductor laser 101, to zero-order light (so-called main beam), +first-order light, i.e. plus first-order light and −first-order light i.e. minus first-order light (so-called sub beam).

The condenser lens 103 makes the incident laser beam LB substantially parallel and makes it enter the optical functional element 104.

The optical path branch element 105 is an optical element for branching the optical path on the basis of a polarization direction, such as a polarized beam splitter (e.g. PBS). Specifically, the optical path branch element 105 (i) transmits the laser beam LB whose polarization direction is one direction, therethrough in such a condition that there is little or no loss of the quantity of light, and (ii) reflects the laser beam LB which enters from the optical disc side and whose polarization direction is another direction (i.e. the reflected light from the optical disc 10 in the laser beam LB) in such a condition that there is little or no loss of the quantity of light. The reflected light reflected on the optical path branch element 105, is received by the light receiving devices PD0, PD1a, and PD1b, through the condenser lens 109 and the cylindrical lens 110.

The reflection mirror reflects the laser beam LB in such a condition that there is little or no loss of the quantity of light.

The ¼ wavelength plate 107 provides the laser beam with a phase difference of 90 degrees, to thereby convert the linearly-polarized laser beam to circularly-polarized light and convert the circularly-polarized laser to the linearly-polarized laser.

The condenser lens 108 focus the incident laser beam LB and irradiates it on the recording surface of the optical disc 10. Specifically, the condenser lens 108 is provided, for example, with an actuator device, and has a driving mechanism for changing the arrangement position of the condenser lens 108. More specifically, the actuator device displaces the position of the condenser lens 108 e.g. objective lens in a focus direction, to thereby focus a focal point on one recording layer (e.g. L0 layer) and another recording layer (e.g. L1 layer) of the optical disc.

The condenser lens 109 focuses the reflected light reflected on the optical path branch element 105.

The cylindrical lens 110 generates astigmatism on the light receiving device PD, for focus control based on an astigmatic method.

The light receiving device PD is provided with the light receiving devices PD0, PD1$a$, and PD1$b$. The light receiving device PD0 receives the zero-order light. The light receiving device PD1$a$ receives the +first-order light. The light receiving device PD1$b$ receives the −first-order light.

(2-1) Light Interference of Signal Light and Stray Light

Next, with reference to FIG. 3 to FIG. 5, an explanation will be given on light interference of signal light and stray light within a general optical pickup. FIG. 3 is one schematic diagram conceptually showing the light interference of the signal light and the stray light within the general optical pickup. FIG. 4 is another schematic diagram conceptually showing the light interference of the signal light and the stray light within the general optical pickup. FIG. 5 are a plan view (FIG. 5($a$)) showing, by dark and light colors, the light intensity if the light interference does not occur in a optical diameter of light received on a light receiving device within the general optical pickup, and a plan view (FIG. 5($b$)) showing, by dark and light colors, the light intensity, if the light interference occurs in the optical diameter of the light received on the light receiving device within the general optical pickup. Incidentally, in FIG. 5, the light intensity at a relatively high level is lighter (or white), and the light intensity at a relatively low level is darker (or black).

As shown in FIG. 3, if a recording or reproduction process is performed on the recording layer on the rear side (i.e. another recording layer in FIG. 2 described above), zero-order stray light is irradiated with it defocused (e.g. dully) in an area including the light receiving device PD0 for receiving the zero-order light, the light receiving device PD1$a$ for receiving the +first-order light, and the light receiving device PD1$b$ for receiving the −first-order light. In particular, the focal point position of the zero-order stray light is on the rear side of the light receiving device PD, viewed from the irradiation side of the laser beam, on an optical axis.

On the other hand, as shown in FIG. 4, if the recording or reproduction process is performed on the recording layer on the front side (i.e. one recording layer in FIG. 2 described above), the zero-order stray light is irradiated with it defocused (e.g. dully) in an area including the light receiving device PD0 for receiving the zero-order light, the light receiving device PD1$a$ for receiving the +first-order light, and the light receiving device PD1$b$ for receiving the −first-order light. In particular, the focal point position of the zero-order stray light is on the front side of the light receiving device PD, viewed from the irradiation side of the laser beam, on an optical axis.

Thus, with regard to the distribution of the light intensity of the laser beam received on the light receiving surface of the light receiving device shown in FIG. 5, if there is the light interference by the stray light, compared to the case where there is no light interference by the stray light (refer to a light (or white) portion in FIG. 5($a$)), the level of the light intensity finely changes in a light flux (refer to a white/black stripe portion in FIG. 5($b$)). The main purpose of the present invention is to reduce an influence of the stray light and to maintain the quality of the signal light at a high level.

(3) Wavelength Plate

Next, with reference to FIG. 6 to FIG. 10, an explanation will be given on the basic structure, location, and optical principle of a wavelength plate (i.e. one specific example of the "optical element" of the present invention) provided for the optical pickup in the embodiment.

(3-1) Basic Structure of Wavelength Plate

Firstly, with reference to FIG. 6 to FIG. 8, an explanation will be given on the basic structure of the wavelength plate provided for the optical pickup in the embodiment. FIG. 6 are a plan view (FIG. 6($a$)) schematically showing a light receiving surface of the wavelength plate provided for the optical pickup in the embodiment, and a cross sectional view (FIG. 6($b$)) schematically showing the location of the wavelength plate. FIG. 7 are schematic diagrams (FIG. 7($a$) and FIG. 7($b$)) schematically showing an optical function as an amplitude grating of the wavelength plate provided for the optical pickup in the embodiment, and a schematic diagram (FIG. 7($c$)) schematically showing an optical function as a phase grating of the wavelength plate.

As shown in FIG. 6($a$), a wavelength plate 111 provided for the optical pickup in the embodiment, is provided with: (i) four areas in which the polarization direction of the transmitted laser beam, is changed (refer to areas "$\lambda/2$" in FIG. 6($a$)); and (ii) five areas in which the polarization direction of the transmitted laser beam, is not changed (refer to areas "$0\lambda$" in FIG. 6($a$)). The areas "$\lambda/2$" allow a predetermined amount of phase difference (i.e. a phase difference of 180 degrees) to be generated, in the phase of a normal light beam and in the phase of an abnormal light beam, on the basis of birefringence. Thus, the laser light transmitted through the areas "$\lambda/2$", can be changed in the polarization direction by 90 degrees, compared to the laser beam that is not transmitted through the areas "$\lambda/2$".

(3-1-1) Amplitude Grating

Specifically, the wavelength plate 111 in the embodiment, functions as an amplitude grating. Here, the amplitude grating in the embodiment, is a so-called transmission diffraction grating or transmission type diffraction grating, which changes the amplitude of the light (i.e. light intensity) on the basis of a predetermined spatial frequency, for example, with the light whose polarization direction is one direction as a reference.

As described above, the polarization direction of one portion of the signal light, which is transmitted through the areas "$\lambda/2$" constructed on the basis of the predetermined spatial frequency, for example, is changed to a first direction (e.g. $\alpha+90$ degrees). At the same time, the polarization direction of one portion of the stray light is also changed to the first direction. On the other hand, the polarization direction of another portion of the signal light, which is transmitted through the areas "$0\lambda$", is changed to a second direction (e.g. a degrees or (0 degree)), which is different from the first direction, or the polarization direction is not changed. At the same time, the polarization direction of another portion of the stray light is also changed to the second direction, or is not changed.

Therefore, as shown in FIG. 7($a$), the light intensity based on the light whose polarization direction is the first direction (e.g. $\alpha+90$ degrees) of the light transmitted through the wavelength plate 111, is defined on the basis of one portion of the signal light and one portion of the stray light, which are transmitted through the areas "λ/2". In addition, another portion of the signal light and another portion of the stray light, which are transmitted through the areas "0λ", hardly influence or do not influence at all the light intensity based on the light whose polarization direction is the first direction. Specifically, the wavelength plate 111 transmits the light whose polarization direction is the first direction (e.g. α+90 degrees) therethrough, with the light intensity (or the amplitude of light) being maintained 100%. In addition, the wavelength plate 111 causes the light intensity (or the amplitude of light) of the light whose polarization direction is the second direction (e.g. α degrees) to be 0%; namely, the wavelength plate 111 blocks the light whose polarization direction is the second direction.

Substantially in the same manner, as shown in FIG. 7(b), the light intensity based on the light whose polarization direction is the second direction (e.g. α degrees) of the light transmitted through the wavelength plate 111, is defined on the basis of another portion of the signal light and another portion of the stray light, which are transmitted through the areas "0λ". In addition, one portion of the signal light and one portion of the stray light, which are transmitted through the areas "λ/2", hardly influence or do not influence at all the light intensity based on the light whose polarization direction is the second direction. Specifically, the wavelength plate 111 transmits the light whose polarization direction is the second direction (e.g. α degrees) therethrough, with the light intensity (or the amplitude of light) being maintained 100%. In addition, the wavelength plate 111 causes the light intensity (or the amplitude of light) of the light whose polarization direction is the first direction (e.g. α+90 degrees) to be 0%; namely, the wavelength plate 111 blocks the light whose polarization direction is the first direction. Incidentally, the function as the amplitude grating described above may be achieved on the basis of various parameters of a phase grating shown in FIG. 7(c) (e.g. a refractive index or a phase difference (e.g. a phase difference between "λ/2" and "λ/4")).

(3-1) Basic Structure of Wavelength Plate (Continued)

In addition, the four areas "λ/2" and the five areas "0λ" are arranged alternately along a Rad direction of the wavelength plate 111, i.e. a radial direction of the optical disc (or a direction to light-receive a push-pull signal), which is one specific example of the reference direction of the present invention. Specifically, the positional relationship between the four areas "λ/2" and the five areas "0λ" may be defined on the basis of the width of a dead band.

(3-1-1) Study by Inventor of Present Invention

Here, with reference to FIG. 8, on the basis of the study by the inventor of the present invention, an explanation will be given on the width of a dead band in the embodiment. Specifically, by the study, the influence of the stray light is quantitatively measured in substantially the central portion of an interference pattern. FIG. 8 are a plan view (FIG. 8(a)) showing, by dark and light colors, the light intensity if the light interference occurs in the optical diameter of the light received on the light receiving device within the optical pickup in the embodiment, a plan view (FIG. 8(b)) showing a relationship between (i) the optical diameter of the light received on the light receiving device within the optical pickup in the embodiment and (ii) the width of the dead band, and a table (FIG. 8(c)) showing a relationship between the width of the dead band and a noise level in the embodiment.

The width of the dead band in the embodiment, means a predetermined width, (i) which allows a predetermined level of light intensity (or amplitude of the push-pull signal corresponding to the predetermined light intensity) to be obtained and (ii) which reduces the light interference between the signal light and the stray light, by blocking (or masking) the light transmission, on the basis of the optical diameter of the signal light irradiated on the light receiving device. Incidentally, the width of the dead band constitutes one specific example of the "area in which the influence of the stray light is relatively large in the optical diameter of the signal light" in the present invention. More specifically, the width of the dead band is set as shown in FIG. 8(b), with respect to the optical diameter of the light irradiated on the light receiving device shown in FIG. 8(a). Thus, as shown in FIG. 8(c), it is possible to obtain the graph indicating a change in the level of noise and the level of the light intensity (i.e. the level of the push-pull signal), with the width of the dead band as a parameter (refer to a horizontal axis). Incidentally, in FIG. 8(c), for example, a thick solid line indicates the level of the amplitude of the push-pull signal of a blue LD (i.e. Laser Diode), a dotted line indicates the level of the amplitude of a SUM (i.e. Summary) output noise, and an alternate long and short dash line indicates the level of the amplitude of a SPP (Signal Pre Pit) output noise. That is, as shown in FIG. 8(c), it is shown that the noise level rapidly reduces as the width of the dead band increases from "2.0". Moreover, it is also shown that the noise level can be reduced by about 70% in a width of the dead band of "3.0".

As a result, it is found that the minimum value of the "area in which the influence of the stray light is relatively large in the optical diameter of the signal light" And in this area, the polarization directions preferably cross at a right angle, or the polarization directions are different by ninety degrees, in order to reduce the influence of the stray light, is determined on the basis of the width of the dead band.

(3-2) Location of Wavelength Plate

Next, an explanation will be given on the placement of the wavelength plate in the embodiment, with reference to FIG. 6 described above.

As shown in FIG. 6(b), the wavelength plate 111 provided for the optical pickup in the embodiment, is disposed between the cylindrical lens 110 and the light receiving device PD. Specifically, the wavelength plate 111 may be disposed in a position of the focal line on the cylindrical lens 110 side on the optical axis. Alternatively, the wavelength plate 111 may be disposed or positioned where (i) the optical diameter of the stray light of zero-order light guided from the recording layer on the rear side if the focal point is on the recording layer on the front side and (ii) the optical diameter of the stray light of zero-order light guided from the recording layer on the front side if the focal point is on the recording layer on the rear side are substantially equal, on the optical axis, as shown in FIG. 3 or FIG. 4.

(3-3) Optical Principle in which Polarization Directions are Different in Signal Light and Stray Light Next, with reference to FIG. 9 and FIG. 10, an explanation will be given on the optical principle in which the polarization directions are different in the signal light and the stray light received on the light receiving device in the embodiment. FIG. 9 are a plan view (FIG. 9(a)) schematically showing the light receiving surface of the wavelength plate in the embodiment, a plan view (FIG. 9(b)) schematically showing a relative positional relationship between (i) the optical diameter in which zero-order light is irradiated and (ii) the optical diameter in which ±first-order light (or ±first-order diffraction light) is irradiated, on the light receiving surface of the wavelength plate, and a plan view (FIG. 9(c)) schematically showing a relative positional relationship among the optical diameter in which zero-order light is irradiated, the optical diameter in which ±first-order light is irradiated, and the optical diameter in which zero-order stray light is irradiated, on the light receiving surface of the light receiving device. FIG. 10 are a plan view and an enlarged plan view (FIG. 10(*a*) and FIG. 10(*b*)) schematically showing a positional relationship among various components in the optical diameter in which zero-order light is irradiated, on the light receiving surface of the light receiving device in the embodiment.

As shown in FIG. 9(*a*) and FIG. 9(*b*), the Tan direction of the wavelength plate 111 may be substantially matched with the axial direction of the focal line. Alternatively, the Rad direction of the wavelength plate 111 may be set to make a predetermined angle (e.g. 45 degrees) with the cylinder direction of the cylindrical lens described above. Therefore, as shown in FIG. 9(*b*), the optical diameter (i.e. light spot) in which the signal light corresponding to the zero-order light is irradiated on the light receiving surface of the wavelength plate 111, is positioned on the four areas "λ/2" described above. Thus, each of the polarization directions of four parts of the signal light transmitted through the respective four areas "λ/2" in the zero-order light is changed by 90 degrees. Moreover, the optical diameter in which the signal light corresponding to the zero-order light is irradiated, is positioned on the three areas "0λ" of the five areas "0λ" described above. Thus, the polarization directions of three parts of the signal light respectively transmitted through the three areas "0λ" of the signal light are not changed. In addition, the optical diameter in which the stray light corresponding to the zero-order light is irradiated, has a relatively large elliptical shape including the four areas "λ/2" and the five areas "0λ" described above, and the stray light is irradiated with it defocused (e.g. dully) on the wavelength plate 111.

Therefore, as shown in FIG. 9(*c*), on the light receiving device PD0, the signal light of the zero-order light whose polarization direction is changed by 90 degrees (refer to "α+90 degrees" and the inside of a shaded circle in FIG. 9(*c*)) is received with the signal light of the zero-order light whose polarization direction is not changed (refer to "α degrees" in FIG. 9(*c*)). Incidentally, the four shaded long and thin rectangular areas positioned diagonally in FIG. 9(*c*), indicate portions in which the polarization direction is changed by 90 degrees in the stray light of the zero-order light.

Specifically, as shown in FIG. 10(*a*) and FIG. 10(*b*), among the four areas in the optical diameter of the zero-order light, in two areas located in the central portion of the optical diameter, the influence of the light interference can be reduced effectively. More specifically, in areas hatched with diagonal lines and located in the central portion of the optical diameter of the zero-order light (refer to an area "b1", an area "b2", an area "b3", an area "b4", or areas with the polarization direction of "α+90 degrees" in FIG. 10(*b*)), the signal light of the zero-order light whose polarization direction is changed by 90 degrees, is received with the stray light of the zero-order light whose polarization direction is not changed (i.e. refer to "α degrees" in FIG. 10(*b*)) (in other words, in such an image that the portion in which the polarization direction is "α+90 degrees" on the front surface of the paper in FIG. 10(*b*) is received with the portion in which the polarization direction is "α degrees" on the rear surface of the paper in FIG. 10(*b*)). Moreover, in white areas (refer to an area "a1", an area "a2", an area "a3", an area "a4", or areas with the polarization direction of "a degrees" in FIG. 10(*b*)) located within the optical diameter of the zero-order light, the signal light of the zero-order light whose polarization direction is not changed, is received with the stray light of the zero-order light whose polarization direction is changed by 90 degrees (i.e. refer to "α+90 degrees" in FIG. 10(*b*)) (in other words, in such an image that the portion in which the polarization direction is "α degrees" on the front surface of the paper in FIG. 10(*b*) is received with the portion in which the polarization direction is "α+90 degrees" on the rear surface of the paper in FIG. 10(*b*)).

As a result, it is possible to reduce the influence of the light interference, more effectively, between (i) the signal light of the zero-order light and (ii) the stray light of the zero-order light, which are transmitted through the wavelength plate 111 which functions as the amplitude grating. In particular, by making the polarization directions be different in the central portion of the optical diameter of the signal light, which is the largest element in determining the light intensity, it is possible to more significantly reduce the influence of the light interference by the stray light, on the light receiving device PD1 on which the signal light is received. Incidentally, in black areas in FIG. 10(*b*), i.e. in an area in the optical diameter of the zero-order light, the signal light of the zero-order light whose polarization direction is not changed, is received with the stray light of the zero-order light whose polarization direction is not changed (in other words, in such an image that the portion in which the polarization direction is "α degrees" on the front surface of the paper in FIG. 10(*b*), is received with the portion in which the polarization direction is "α degrees" on the rear surface of the paper in FIG. 10(*b*)), and the light interference increases. Alternatively, the signal light of the zero-order light whose polarization direction is changed, is received with the stray light of the zero-order light whose polarization direction is changed (in other words, in such an image that the portion in which the polarization direction is "α+90 degrees" on the front surface of the paper in FIG. 10(*b*), is received with the portion in which the polarization direction is "α+90 degrees" on the rear surface of the paper in FIG. 10(*b*)), and the light interference increases. However, these portions are distributed within the optical diameter of the zero-order light, so that it is a small element in determining the light intensity.

Moreover, as a result, by virtue of the wavelength plate 111 which functions as the amplitude grating, it is possible to effectively reduce the influence of the light interference by the stray light on the signal light. In other words, because the light that receives the light interference by the stray light, is diffracted by the amplitude grating, the influence of the light interference is also dispersed and thus can be effectively reduced. In addition, it is also possible to effectively reduce the influence of the light interference between (i) the signal light of the zero-order light and (ii) the stray light of the zero-order light, in which the polarization directions are different.

As a result, it is possible to make the light receiving device receive the signal light, under the condition that the influence of the stray light is relatively reduced and the level of the light intensity (or the amplitude of the light corresponding to the light intensity) is maintained to be higher, for example, in the focus control and the tracking control on the multilayer type information recording medium, to thereby achieve the highly-accurate focus control and tracking control.

(3-4) Study of Operation and Effect of Wavelength Plate in Embodiment

Next, with reference to FIG. 11, an explanation will be given on the operation and effect of the wavelength plate in the embodiment. FIG. 11 is a schematic diagram schematically showing a correlation between the level of the light interference and the function as the amplitude grating, on the wavelength plate in the embodiment.

As shown in an upper part of FIG. 11, if the wavelength plate 111 in the embodiment, does not function as the amplitude grating, the level of the light interference becomes relatively large in response to a relatively wide width. In other words, the light intensity of the signal light (e.g. white contrast shown on the left side) and the light intensity of the stray light (e.g. black contrast shown on the right side), which are transmitted through one area of the wavelength plate 111, interfere with each other at a relatively large level. And the light intensity of the signal light is significantly influenced by the light interference by the stray light.

Then, as shown in a middle part to a lower part in FIG. 11, if the wavelength plate 111 functions as the amplitude grating with small intervals, the level of the light interference becomes relatively small in response to a relatively narrow width of the intervals. In other words, the light intensity of the signal light (e.g. white contrast shown on one of the areas) and the light intensity of the stray light (e.g. black contrast shown on another of the area), which are transmitted through small areas of the wavelength plate 111, interfere with each other at a relatively small level. And it is possible to reduce the influence of the light interference by the stray light, in the light intensity of the signal light.

As a result, by virtue of the wavelength plate 111 which functions as the amplitude grating, it is possible to effectively reduce the influence of the light interference by the stray light on the signal light. In other words, because the light that receives the light interference by the stray light, is diffracted by the amplitude grating, the influence of the light interference is also dispersed and thus can be effectively reduced. In addition, it is also possible to effectively reduce the influence of the light interference between (i) the signal light of the zero-order light and (ii) the stray light of the zero-order light, in which the polarization directions are different.

As a result, it is possible to make the light receiving device receive the signal light, under the condition that the influence of the stray light is effectively reduced and the level of the light intensity (or the amplitude of light corresponding to the light intensity) is maintained to be higher, for example, in the focus control and the tracking control on the multilayer type information recording medium, to thereby achieve the highly accurate focus control and tracking control.

(4) Another Embodiment

Next, with reference to FIG. 12 to FIG. 15, an explanation will be given on another basic structure, position, and optical principle of a wavelength plate (i.e. one specific example of the "optical element" of the present invention) provided for an optical pickup in another embodiment. Incidentally, substantially the same structure as that in the aforementioned embodiment carries the same numerical reference, and the explanation thereof will be omitted.

(4-1) Another Structure of Wavelength Plate (Ver. 1)

Firstly, with reference to FIG. 12 and FIG. 13, an explanation will be given on another structure of a wavelength plate provided for an optical pickup in another embodiment. FIG. 12 are a plan view (FIG. 12(*a*)) schematically showing the light receiving surface of the wavelength plate provided for the optical pickup in another embodiment, and plan views (FIG. 12(*b*) and FIG. 12(*c*)) schematically showing a Duty ratio of the light receiving surface of the wavelength plate. FIG. 13 are a schematic view (FIG. 13(*a*)) schematically showing a ratio of dispersion of light intensity of the signal light corresponding to a Duty ratio i.e. (1:1) and a schematic view (FIG. 13(*b*)) schematically showing a ratio of dispersion (so-called light dispersion ratio or spectral ratio) of light intensity of the signal light corresponding to a Duty ratio i.e. (2:1), in another embodiment.

As shown in FIG. 12(*a*), a wavelength plate 111 provided for the optical pickup in the another embodiment, may be constructed such that the areas "$\lambda/2$" and the areas "$0\lambda$" described above are disposed on the basis of a predetermined Duty ratio, within the optical diameter of the signal light of the zero-order light. Specifically, in the wavelength plate 111, (i) the minimum value of the width in which the areas "$\lambda/2$" and the areas "$0\lambda$" are disposed, may be defined on the basis of the width of the dead band described above. At the same time, (ii) the maximum value of the width in which the areas "$\lambda/2$" and the areas "$0\lambda$" are disposed, may be defined on the basis of the diffraction angle and optical diameter of the signal light of the ±first-order diffraction light.

As a result, on the basis of the minimum value of the width in which the areas "$\lambda/2$" and the areas "$0\lambda$" are formed, it is possible to more effectively reduce the influence of the light interference between (i) at least one portion of the signal light and (ii) another portion of the stray light other than or except at least one portion of the stray light, in which the polarization directions are different. In addition, on the basis of the maximum value of the width in which the areas "$\lambda/2$" and the areas "$0\lambda$" are formed, it is possible to make the light receiving device receive the signal light, under the condition that the influence of the stray light is effectively reduced and the level of the light intensity is maintained to be higher, for example, in the focus control and the tracking control based on a one-beam or three-beam method on the multilayer type information recording medium, to thereby achieve the highly-accurate tracking control.

In addition, as shown in FIG. 12(*b*), in the wavelength plate 111 in another embodiment, the areas "$\lambda/2$" and the areas "$0\lambda$" may be disposed such that a special frequency in which the areas "$\lambda/2$" and the areas "$0\lambda$" are disposed, has a Duty ratio of "1:1" (incidentally, "2:2" in a comparison with FIG. 12(*c*) described later). Therefore, as shown in FIG. 13(*a*), it is possible to assign the light intensity of the signal light to a zero-order diffraction component at one ratio of "A %". As a result, on the basis of the extent of relatively low dispersion of the light intensity corresponding to the spatial frequency with a Duty ratio of 1:1, it is possible to make the light receiving device receive the signal light, under the condition that the influence of the stray light is effectively reduced and the level of the light intensity is maintained to be higher, for example, in the focus control and the tracking control based on the one-beam method on the multilayer type information recording medium, to thereby achieve the highly-accurate focus control and tracking control.

Alternatively, as shown in FIG. 12(*c*), in the wavelength plate 111 in another embodiment, the areas "$\lambda/2$" and the areas "$0\lambda$" may be disposed such that a special frequency in which the areas "$\lambda/2$" and the areas "$0\lambda$" are disposed, has a Duty ratio of "2:1". Therefore, as shown in FIG. 13(*b*), it is possible to assign the light intensity of the signal light to ±first-order diffraction components at another ratio of "B'%". As a result, on the basis of the extent of relatively high dispersion of the light intensity corresponding to the spatial frequency with a Duty ratio of 2:1, it is possible to make the light receiving device receive the signal light, under the condition that the influence of the stray light is effectively reduced and the level of the light intensity is maintained to be higher, for example, in the focus control and the tracking control based on the one-beam or three-beam method on the multilayer type information recording medium, to thereby achieve the highly-accurate focus control and tracking control.

As a result, it is possible to more effectively reduce the influence of the light interference by the stray light on the signal light, particularly in the central portion of the optical diameter, by changing the ratio of dispersion of the light intensity of the signal light (so-called spectral ratio) in the wavelength plate 111 which functions as the amplitude grating. In other words, because the light that receives the light interference by the stray light, is diffracted by the amplitude grating, the influence of the light interference is also dispersed and thus can be effectively reduced. In addition, it is also possible to effectively reduce the influence of the light interference between (i) the signal light of the zero-order light and (ii) the stray light of the zero-order light, in which the polarization directions are different.

(4-2) Another Structure of Wavelength Plate (Ver. 2)

Next, with reference to FIG. 14, an explanation will be given on another structure of a wavelength plate provided for an optical pickup in another embodiment. FIG. 14 are a plan view (FIG. 14(*a*)) schematically showing a relative magnitude and a relative positional relationship between the optical diameter of zero-order light and the optical diameter of ±first-order light, a plan view (FIG. 14(*b*)) schematically showing the light receiving surface of the wavelength plate, and a plan view (FIG. 14(*c*)) schematically showing, by dark and light colors, the distribution of the light intensity in the optical diameters of zero-order light and ±first-order diffraction light, in another embodiment.

In the optical pickup in another embodiment, as shown in FIG. 14(*a*) and FIG. 14(*b*), the zero-order light and the ±first-order light may be irradiated along the Tan direction of the wavelength plate 111.

As a result, it is possible to make the light receiving device receive the signal light, under the condition that the influence of the stray light is effectively reduced and the level of the light intensity is maintained to be higher (refer to a white portion in which the light intensity is at a high level, of a portion shown by dark and light colors in FIG. 14(*c*)), for example, in the focus control and the tracking control based on a one-beam or three-beam method on the multilayer type information recording medium, to thereby achieve the highly-accurate focus control and tracking control.

(4-3) Another Structure of Wavelength Plate (Ver. 3)

Next, with reference to FIG. 15, an explanation will be given on another structure of a wavelength plate provided for an optical pickup in another embodiment. FIG. 15 is a cross sectional view along an optical axis schematically showing the placement of the wavelength plate, provided for the optical pickup in another embodiment.

As shown in a right part of FIG. 15, in the wavelength plate in another embodiment, if the aforementioned spatial frequency is relatively large (i.e. the interval of the plurality of areas is narrow in response to the relatively small optical diameter), the wavelength plate 111 may be disposed relatively close to the light receiving device. In the aforementioned spatial frequency, (i) the plurality of areas "λ/2" which allow the polarization direction to be "α+90 degrees" and (ii) the plurality of areas "0λ" which allow the polarization direction to be "α degrees", are alternately formed As a result, the optical element based on the relatively large spatial frequency can be disposed close to the light receiving element, so that it is possible to achieve a saved space.

In particular, in the wavelength plate 111, (i) the area "0λ" with a predetermined width and (ii) the two areas "λ/2" which sandwich the area "0λ" therebetween, may be formed.

As a result, it is possible to achieve the wavelength plate 111 in another embodiment, using less constituent elements having the one area "0λ" and the two areas "λ/2", for example.

Alternatively, as shown in a left part of FIG. 15, in the wavelength plate in another embodiment, if the aforementioned spatial frequency in which the plurality of areas "λ/2" described above the plurality of areas "0λ" described above are alternately formed, is relatively large (i.e. the interval of the plurality of areas is wide in response to the relatively large optical diameter), the wavelength plate 111 may be disposed relatively far from the light receiving device.

As a result, it is possible to reduce needs for small parts and precision machining, on the basis of the relatively small spatial frequency of the wavelength plate 111, so that it is possible to simplify a process of manufacturing the wavelength plate.

The present invention is not limited to the aforementioned embodiments, but various changes may be made, if desired, without departing from the essence or spirit of the invention which can be read from the claims and the entire specification. An optical pickup and information equipment, all of which involve such changes, are also intended to be within the technical scope of the present invention.

INDUSTRIAL APPLICABILITY

The optical pickup and the information equipment of the present invention can be applied to an optical pickup for irradiating an information recording medium, such as a DVD, with a laser beam when an information signal is recorded or reproduced, and information equipment provided with the optical pickup.

The invention claimed is:

1. An optical pickup for recording or reproducing an information signal with respect to an optical disc comprising a plurality of recording layers, each recording layer having a recording track in which information pits are arranged, the information signal being recorded in the information pits, said optical pickup comprising:
    a light source for irradiating a laser beam;
    a diffracting device for diffracting the irradiated laser beam;
    an optical system for guiding the diffracted laser beam to one recording layer of the plurality of recording layers;
    an optical element which functions as an amplitude grating with respect to (i) signal light generated in the one recording layer and (ii) stray light generated in another recording layer of the plurality of recording layers, if the guided laser beam is focused on the one recording layer; and
    one or a plurality of light receiving devices for receiving at least the signal light.

2. The optical pickup according to claim 1, wherein said optical element is the amplitude grating based on light intensity of either (i) light whose polarization direction is a first direction or (ii) light whose polarization direction is a second direction which is different from the first direction.

3. The optical pickup according to claim 1, wherein
    in said optical element, (i) one or a plurality of first areas, which allow a polarization direction to be a first direction both in one portion of the signal light generated in the one recording layer and in one portion of the stray light generated in the another recording layer of the plurality of recording layers, and (ii) one or a plurality of second areas, which allow a polarization direction to be a second direction both in another portion of the signal light and in another portion of the stray light, are alternately formed along a reference direction, and said light receiving device receives (iii) the one portion of the signal light and the another portion of the stray light, or (iv) the another portion of the signal light and the one portion of the stray light.

4. The optical pickup according to claim 3, wherein the reference direction is defined on the basis of a radial direction of the optical disc.

5. The optical pickup according to claim 3, wherein the reference direction crosses, at a right angle, the polarization direction of the signal light which enters said optical element.

6. The optical pickup according to claim 3, wherein
said optical pickup further comprises a cylindrical lens for performing an astigmatic method, and
the reference direction is defined on the basis of a cylinder direction of said cylindrical lens.

7. The optical pickup according to claim 3, wherein the first direction and the second direction have polarization surfaces which are relatively different by 90 degrees.

8. The optical pickup according to claim 3, wherein at least one of the first area and the second area is a λ/2 wavelength plate.

9. The optical pickup according to claim 3, wherein if a spatial frequency in which the plurality of first areas and the plurality of second area are alternately formed, is relatively large, said optical element is disposed relatively close to said light receiving device.

10. The optical pickup according to claim 3, wherein if a spatial frequency in which the plurality of first areas and the plurality of second area are alternately formed, is relatively small, said optical element is disposed relatively far from said light receiving device.

11. The optical pickup according to claim 3, wherein a width in which the first area and the second area are formed, is defined on the basis of (i) an area or a shape of an area in which an influence of the stray light is relatively large in an optical diameter of the signal light and (ii) a position of a center of the optical diameter of the signal light.

12. The optical pickup according to claim 3, wherein (i) a minimum value of a width in which the first area and the second area are formed, is defined on the basis of a size of an area or a shape of an area in which an influence of the stray light is relatively large in an optical diameter of the signal light and (ii) a maximum value of the width is defined on the basis of a diffraction angle and an optical diameter of a diffraction light component of the signal light.

13. The optical pickup according to claim 3, wherein (i) the first area with a predetermined width and (ii) the two second areas which sandwich the first area therebetween, are formed in said optical element.

14. The optical pickup according to claim 3, wherein the plurality of first areas and the plurality of second areas are alternately formed in said optical element, in an entire area in which the signal light or the stray light is transmitted through said optical element.

15. The optical pickup according to claim 3, wherein the plurality of first areas and the plurality of second areas are alternately formed, on the basis of a predetermined spatial frequency.

16. The optical pickup according to claim 3, wherein a spatial frequency in which the plurality of first areas and the plurality of second areas are alternately formed, is defined to be relatively large, on the basis of light intensity of a zero-order light component of the signal light.

17. The optical pickup according to claim 3, wherein a spatial frequency in which the plurality of first areas and the plurality of second areas are alternately formed, is defined to be relatively small, on the basis of light intensity of± first-order light components of the signal light.

18. The optical pickup according to claim 3, wherein a spatial frequency in which the plurality of first areas and the plurality of second areas are alternately formed, is defined, on the basis of a spatial frequency with a Duty ratio of 1:1.

19. The optical pickup according to claim 3, wherein a spatial frequency in which the plurality of first areas and the plurality of second areas are alternately formed, is defined, on the basis of a spatial frequency with a Duty ratio of n:m (wherein n and m are natural numbers).

20. The optical pickup according to claim 3, wherein
said optical element differentiate the polarization direction of a diffraction light component of the signal light and the polarization direction of the stray light, and
said light receiving device includes at least a second light receiver and a third receiver, of a first light receiver for receiving a zero-order light component of the signal light, the second light receiver for receiving a +first-order light component, and the third light receiver for receiving a –first-order light component.

21. The optical pickup according to claim 3, further comprising a controlling device for controlling said optical system to guide the laser beam to the recording track provided for or the one recording layer, on the basis of the received signal light.

22. An information equipment comprising:
an optical pickup; and
a recording/reproducing device for irradiating an optical disc with a laser beam, to thereby record or reproduce an information signal, wherein
said optical pickup is for recording or reproducing the information signal with respect to the optical disc comprising a plurality of recording layers, each recording layer having a recording track in which information pits are arranged, the information signal being recorded in the information pits, said optical pickup is comprising:
a light source for irradiating a laser beam;
a diffracting device for diffracting the irradiated laser beam;
an optical system for guiding the diffracted laser beam to one recording layer of the plurality of recording layers;
an optical element which functions as an amplitude grating with respect to (i) signal light generated in the one recording layer and (ii) stray light generated in another recording layer of the plurality of recording layers, if the guided laser beam is focused on the one recording layer; and
one or a plurality of light receiving devices for receiving at least the signal light.

* * * * *